(12) United States Patent
Dickie et al.

(10) Patent No.: US 10,704,530 B2
(45) Date of Patent: Jul. 7, 2020

(54) METHOD AND APPARATUS FOR GENERATING ELECTRICITY

(71) Applicants: Robert G. Dickie, King City (CA); Chris Pearen, King City (CA); Paige Elyse Dickie, Stouffville (CA)

(72) Inventors: Robert G. Dickie, King City (CA); Chris Pearen, King City (CA); Paige Elyse Dickie, Stouffville (CA)

(*) Notice: Subject to any disclaimer, the term of this patent is extended or adjusted under 35 U.S.C. 154(b) by 0 days.

(21) Appl. No.: 15/891,967

(22) Filed: Feb. 8, 2018

(65) Prior Publication Data

US 2019/0170111 A1    Jun. 6, 2019

Related U.S. Application Data

(60) Provisional application No. 62/593,659, filed on Dec. 1, 2017.

(51) Int. Cl.
| | | |
|---|---|---|
| F03B 13/14 | (2006.01) | |
| F03B 17/06 | (2006.01) | |
| F03B 11/02 | (2006.01) | |
| F03B 11/08 | (2006.01) | |
| F03B 13/10 | (2006.01) | |

(Continued)

(52) U.S. Cl.
CPC ............ *F03B 17/067* (2013.01); *F03B 11/02* (2013.01); *F03B 11/08* (2013.01); *F03B 13/10* (2013.01); *F03B 13/141* (2013.01); *F03B 13/22* (2013.01); *F03B 17/061* (2013.01); *H02K 7/1823* (2013.01); *F05B 2240/12* (2013.01); *F05B 2240/40* (2013.01); *F05B 2260/02* (2013.01);

(Continued)

(58) Field of Classification Search
CPC ........ F03B 13/141; F03B 13/22; F03B 13/10; F03B 13/12; F03B 17/061
See application file for complete search history.

(56) References Cited

U.S. PATENT DOCUMENTS 993,074 A * 5/1911 Kell .................... B01D 33/073
                                                    210/157
1,645,996 A * 10/1927 McQuiston ........... F03B 17/065
                                                    416/119

(Continued)

FOREIGN PATENT DOCUMENTS

| DE | 10134522 | 2/2003 |
| WO | 2014168287 | 10/2014 |
| WO | 2016129836 | 8/2016 |

OTHER PUBLICATIONS

Electrovaya webpage, http://electrovaya.com/systems/stationary-power/, Turnkey Systems, publicly available as of Feb. 8, 2018, 1 page.

*Primary Examiner* — Sean Gugger
(74) *Attorney, Agent, or Firm* — Sand, Sebolt & Wernow Co., LPA

(57) ABSTRACT

An energy generating device having a drum and at least one vane that is movable between a deployed state and a stowed state as the drum rotates to capture energy potential from flowing water and converting it to usable electrical and/or mechanical energy. The movable vanes can automatically retract when not in the flow of water and re-deploy when entering the flow of water over the drum. The present system can generate usable electricity or mechanical energy from slow but steadily flowing bodies of water without the need to dam, restrict, or alter the path of the water flow.

16 Claims, 27 Drawing Sheets

(51) Int. Cl.
*H02K 7/18* (2006.01)
*F03B 13/22* (2006.01)

(52) U.S. Cl.
CPC ..... *F05B 2260/406* (2013.01); *F05B 2260/42* (2013.01)

(56) References Cited

U.S. PATENT DOCUMENTS

| | | | | |
|---|---|---|---|---|
| 2,379,324 A * | 6/1945 | Topalov | ............... | F03B 17/065 415/4.2 |
| 3,912,937 A * | 10/1975 | Lesser | ............... | F03B 17/065 290/43 |
| 4,104,536 A * | 8/1978 | Gutsfeld | ............... | F03B 17/063 290/54 |
| 4,408,956 A * | 10/1983 | Price, Sr. | ............... | F03D 3/067 416/119 |
| 4,516,033 A * | 5/1985 | Olson | ............... | F03B 17/062 290/42 |
| 4,679,985 A * | 7/1987 | Worms | ............... | F03B 17/065 416/119 |
| 4,748,808 A * | 6/1988 | Hill | ............... | F03B 13/184 290/54 |
| 7,918,648 B1 * | 4/2011 | Simnacher | ............... | F03D 3/067 416/111 |
| 8,076,791 B2 * | 12/2011 | Hostetler | ............... | F03B 17/067 290/54 |
| 8,102,071 B2 * | 1/2012 | Catlin | ............... | F03B 13/264 290/54 |
| 8,120,196 B1 * | 2/2012 | Neese | ............... | F03B 13/183 290/53 |
| 8,354,758 B1 * | 1/2013 | Boschma | ............... | F03B 17/065 290/43 |
| 8,546,966 B1 * | 10/2013 | Santos | ............... | F03B 11/002 290/43 |
| 8,933,575 B2 * | 1/2015 | Lipman | ............... | F03B 13/264 290/54 |
| 9,011,096 B2 * | 4/2015 | Su | ............... | F03D 3/02 416/111 |
| 9,512,816 B2 | 12/2016 | Ferguson | | |
| 9,739,253 B1 | 8/2017 | Ferguson | | |
| 10,077,756 B2 * | 9/2018 | Trevarthen | ............... | F03B 13/264 |
| 2009/0096214 A1 * | 4/2009 | Sternitzke | ............... | F03B 13/145 290/53 |
| 2009/0230686 A1 | 9/2009 | Catlin | | |
| 2010/0213716 A1 * | 8/2010 | Santoro | ............... | F03D 1/04 290/54 |
| 2012/0074704 A1 * | 3/2012 | Rooney | ............... | F03B 13/10 290/54 |
| 2013/0069372 A1 * | 3/2013 | Ferguson | ............... | F03B 7/003 290/54 |
| 2013/0333370 A1 * | 12/2013 | Hopper | ............... | F03B 13/08 60/495 |
| 2014/0284925 A1 * | 9/2014 | Ross | ............... | F03B 13/264 290/42 |
| 2016/0019497 A1 | 1/2016 | Carvajal | | |
| 2016/0046504 A1 | 2/2016 | Riley et al. | | |
| 2018/0023539 A1 * | 1/2018 | Oh | ............... | F03B 3/12 416/181 |
| 2019/0186458 A1 | 6/2019 | Obermeyer et al. | | |

* cited by examiner

METHOD AND APPARATUS FOR GENERATING ELECTRICITY

CROSS REFERENCE TO RELATED APPLICATIONS

This application claims the benefit of U.S. Provisional Application Ser. No. 62/593,659, filed on Dec. 1, 2017; the disclosures of which are incorporated herein by reference.

BACKGROUND

Technical Field

The present disclosure relates generally to the field of hydro-electric and hydro-mechanical energy generation. More particularly, the present disclosure relates to the use of a small scale generator to convert the energy potential from flowing water to usable electrical or mechanical energy. Specifically, the present disclosure relates to a more efficient and portable energy generator that can generate electrical or mechanical energy using a water rotor or water turbine having retractable vanes.

Background Information

The use of renewable energy sources is increasingly important in today's society. The most common past solutions for renewable energy tend to fall into one of three categories: hydro-electric or hydro-mechanical energy, solar energy, and wind energy. Solar energy is generally costly, solar panels can be unsightly, and can require a large amount of land to install a solar facility. Additionally, solar panels degrade in performance every year. Wind energy requires large wind turbines that can also be unsightly, take up large areas of land, and also degrade in performance year to year. Another concern raised by the use of wind turbines is their environmental impact with wind turbines killing over 200,000 birds annually.

Generating electricity or mechanical energy through the use of flowing water, however, is much more efficient and costs substantially less than wind turbines or solar power. Compared to air, water can have up to 800 times the energy per square inch due to its greater density. There is interesting potential in the further use of hydro-electric and hydro-mechanical power on a smaller scale in that a river. For example, the Nile, which flows at an average rate of 4 mph for over 1,000 miles, can drive small generators that are easily placed, replaced, maintained and/or moved allowing electrical or mechanical energy to be delivered to smaller communities and individuals nearly anywhere in the world. Take, for example, many communities in Africa do not have electrical power and rely on generators if they can afford them, provided they can find access to purchase diesel fuel to power these generators. Other more remote settlements or villages may not have access to generators or fuel; therefore they have little or no access to electrical power. As most of these villages are settled near fresh water, generally a river or stream, a solution is needed to harness the power of these smaller rivers and streams to generate electricity on a small scale and make electrical and mechanical power more accessible to those who live too far away from, or cannot afford to be part of a larger scale system. Alternatively, persons in more developed countries may utilize the present device to generate power to run their own homestead, therefore not relying on large scale power production from a utility company. In some areas and communities, connecting these devices to the power grid and contributing to the overall production of power, could earn a user a stipend or other incentive from the utility companies.

In some instances, villages or settlements may have settled or exist at a distance away from a flowing body of water that would make it impractical to run electrical transmission lines from the present device to the desired area of use. In these instances, a way to reliably capture and transport stored power in the form of battery power can be critical to providing electricity to individuals and communities in such a location.

SUMMARY

In one aspect, the present disclosure may provide an energy generating device having: a body; a cylindrical drum contained within the body and rotatable about a substantially transverse axis; a stationary cam; and at least one movable vane connected to outer surface of the drum; wherein the at least one vane is movable to a plurality of positions between a deployed state and a stowed state.

In another aspect, the present disclosure may provide a method of generating energy with the steps of: installing a portable energy generating device within a flowing body of water; directing a stream of flowing water over a rotatable drum within the energy generating device; deploying at least one movable vane into the flow of water over the drum; capturing the potential energy from the flowing water with the at least one movable vane; converting potential energy from the water flowing over the drum into rotational energy to rotate the drum; capturing the rotational energy of the drum with a generator; and directing the flow of energy from the generator to an end location remote from the energy generating device.

BRIEF DESCRIPTION OF THE SEVERAL VIEWS OF THE DRAWINGS

A sample embodiment of the disclosure is set forth in the following description, is shown in the drawings and is particularly and distinctly pointed out and set forth in the appended claims. The accompanying drawings, which are fully incorporated herein and constitute a part of the specification, illustrate various examples, methods, and other example embodiments of various aspects of the disclosure. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

Similar numbers refer to similar parts throughout the drawings.

DETAILED DESCRIPTION

Figure 1:
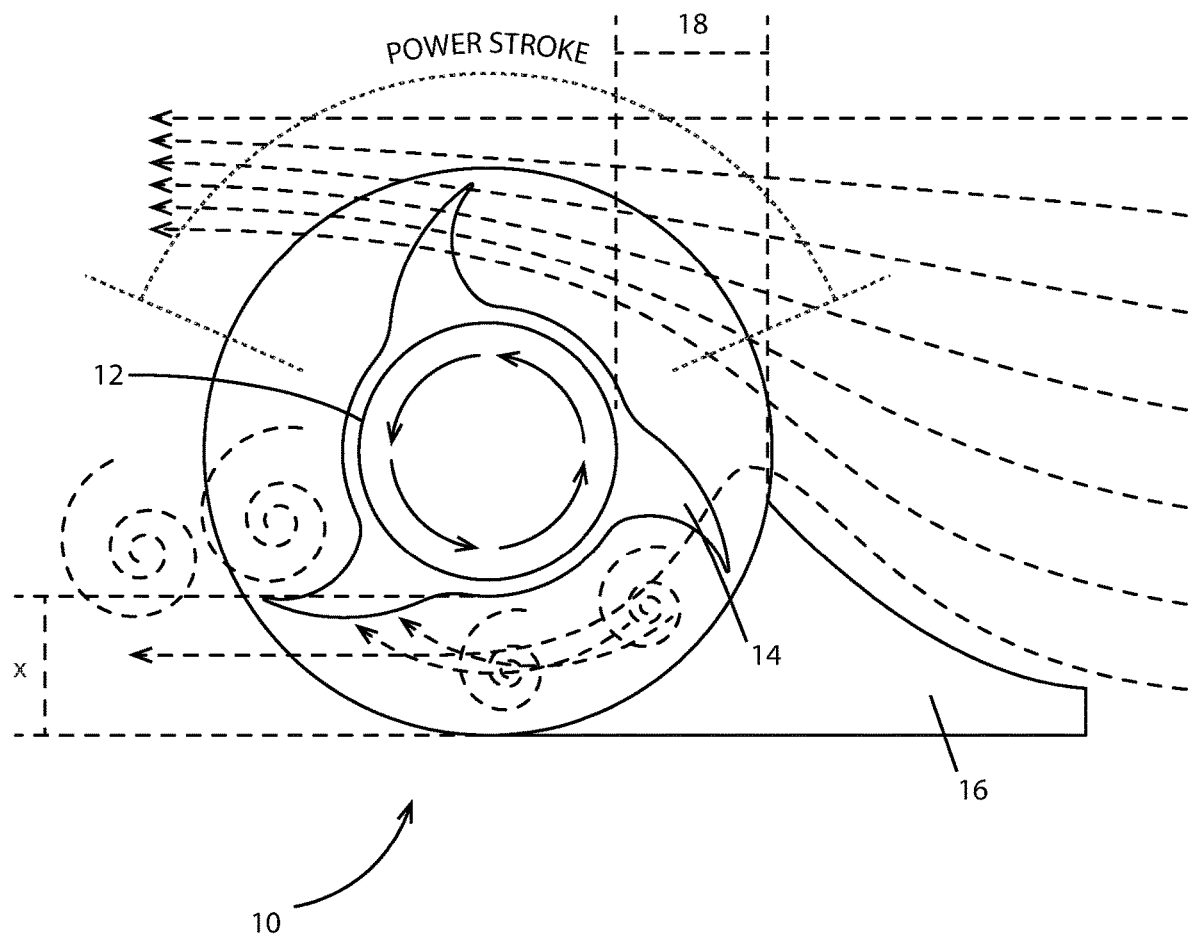
FIG. 1 is a left side elevation view of a prior art device with flow analysis view.

With reference to FIG. 1, a prior art device is shown similar to that which is described in U.S. Pat. Nos. 9,512,816 and 9,739,253 to Ferguson. The prior art electrical generator or water rotor generally indicated at 10 consists of a rotating drum 12 with three fixed vanes 14 and a ramp 16. The drum 12 and ramp 16 are spaced apart thereby defining a transverse gap 18. The transverse gap 18 is of sufficient size to allow clearance of fixed vanes 14. The prior art design, as illustrated in FIG. 1, has fixed vanes 14 which create a high level of turbulence and drag. As noted in FIG. 1, the top third of the rotation of drum 12 can be considered the power stroke zone whereby water flowing over the drum pushes the vanes and thereby rotating drum 12. This rotational energy is captured and stored as electrical energy. The downward moving vanes 14 at the rear of drum 12 begin moving against turbulent and/or stagnant water and create turbulence behind the blade causing drag on the fixed vane and the drum. The vanes 14 in the bottom third or last third of the drum's rotation are now moving against water flow as seen in the flow diagram FIG. 1, thereby causing vanes 14 to push water against the flow and creating additional drag on the front edge of vane 14. The large distance defining the transverse gap 18 allows significant water flow over the end of ramp 16 and below thereby further compounding this problem. The fixed vanes 14 of the prior art device are larger and have longer front fairings which contribute to the creation of turbulence and drag thereby robbing the prior art system of efficiency and raising the relative costs of the energy produced.

With reference to FIGS. 2-18, the apparatus for generating electricity, hereinafter referred to as energy generating device and identified as reference 20, includes a first or upstream end 22, and a second or downstream end 24 defining therebetween a longitudinal direction. Energy generating device 20 includes a first side 26 and a second side 28 therebetween defining a transverse direction, and a top side 30 and bottom side 32 therebetween defining a vertical direction. Energy generating device 20 further comprises ramp 48, drums 34A or 34B, spoiler 38, ballast box 40, and generator 42. Drums 34A or 34B further include one or more vanes 36.

Ramp 48 consists of upstream edge 47 which coincides with upstream end 22 of energy generating device 20. Ramp 48 also includes a downstream edge 49 with upstream edge 47 and downstream edge 49 defining therebetween a longitudinal direction. Ramp 48 also includes first ramp sidewall 50 and second ramp sidewall 52 defining therebetween a transverse direction. Upstream edge 47 of ramp 48 may be fluted and may be wider than downstream edge 49. The fluting of ramp 48 in connection with first ramp sidewall 50 and second ramp sidewall 52 helps collect and direct more water flow up and over the ramp 48 and through energy generating device 20 which in turn results in more energy generation. Ramp 48 can also serve to accelerate the flow of water through the energy generating device 20 which can further increase power production. As water begins to hit the ramp 48, it is directed both upwards and sideways which results in more water attempting to escape from sides of ramp 48. To combat this, first ramp sidewall 50 and second ramp sidewall 52 can increase in vertical height as you move from the upstream to the downstream direction to help capture the largest proportion of the volume of water moving over ramp 48. Additionally, as water moves over ramp 48, downforce can be generated which helps in keeping the device in place on the bottom of the body of water in which it is installed.

Figure 9:
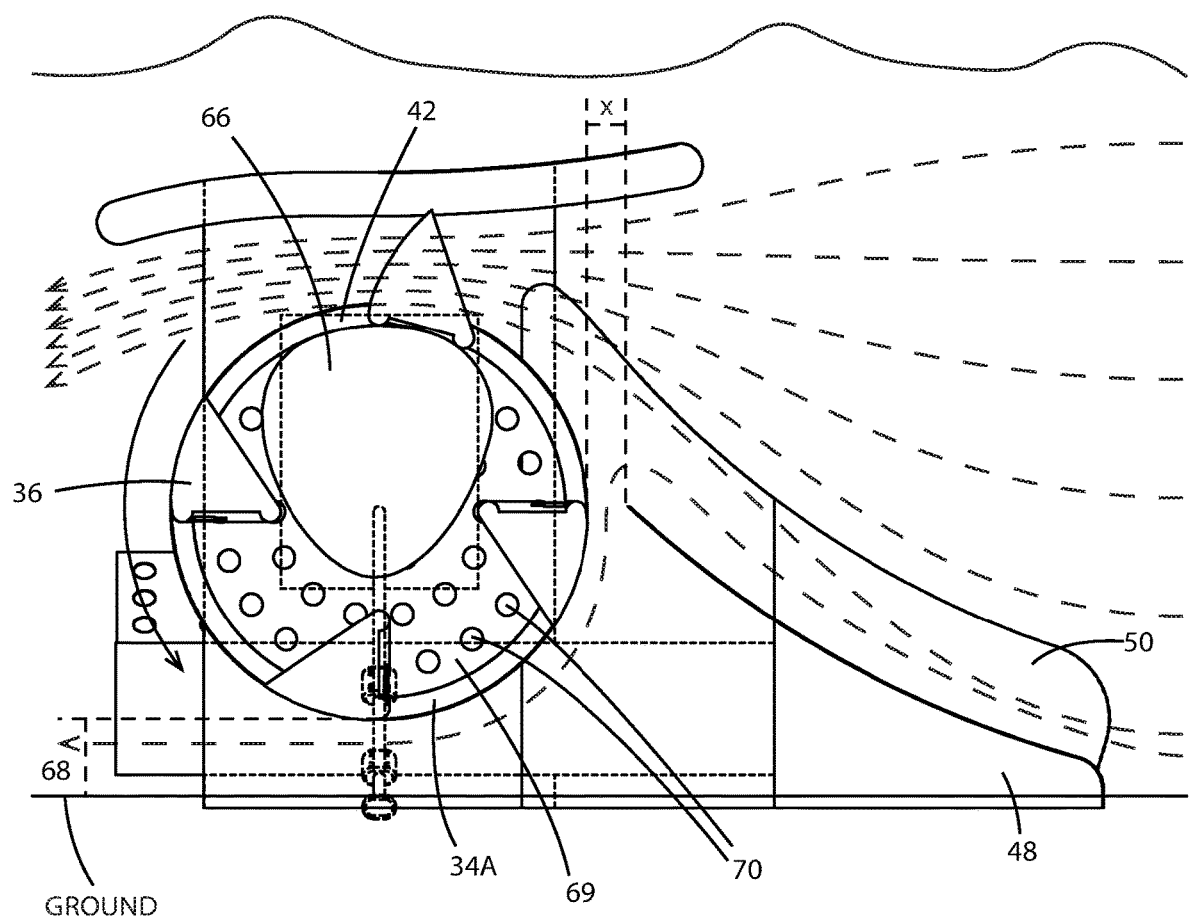
FIG. 9 is a longitudinal cross section view of the described device, depicting a flow analysis.

With reference to FIGS. 9-11 and 16, immediately downstream of ramp 48 is drum 34A. Drum 34A comprises a hollow, cylindrical drum having an outside surface 35. Outside surface 35 of drum 34A and downstream edge 49 of ramp 48 defining therebetween a transverse gap 54. Drum 34A extends transversely between first side 26 and second side 28 of energy generating device 20 and is situated about an internal axle (not shown) allowing drum 34A to freely rotate about the axle along a transverse axis. Drum 34A is mounted within energy generating device 20 such that it is positioned above the ground surface as shown in FIG. 9, with outside surface 35 of drum 34A and the ground defining therebetween a vertical gap 68. Transverse gap 54 and vertical gap 68 allow for the flow of water over the downstream edge 49 of ramp 48 and through vertical gap 68 exiting the downstream end 24 of energy generating device 20. Drum 34A can have end caps 69 transversely disposed at each of the first side 26 and second side 28 to add structural support to drum 34A. According to one aspect of the present disclosure, end cap 69 can include one or more holes 70 which can allow water and air to flow in and out of drum 34A which can operate to assist with the installation of energy generating device 20 under the surface of the associated body of water. The displacement of air and filling of drum 34A with water also serves to reduce buoyancy thereby helping keep energy generating device 20 on the bottom of the associated body of water.

With reference to FIGS. 9-13, energy generating device 20 can have one or more vanes 36 distributed about drum 34A. As seen in the figures, four vanes 36 are evenly distributed about drum 34A. However, more or less than four vanes can be adapted for use in the system without deviating from the scope of the present disclosure herein. Vanes 36 include a first vane sidewall 55, a second vane sidewall 56, a vane rear wall 57, a upstream edge 58, and a guide edge 59 combining to define a generally triangular shaped profile. The walls 55, 56, and 57 are connected together such that the overall shape of vanes 36 and vane rear wall 57 can be curved to sit flush against outside surface 35 of drum 34A when fully stowed. Upstream edge 58 can be opposite vane rear wall 57 and, in conjunction with first vane sidewall 55 and second vane sidewall 56, create a cup-like vane 36 which can catch water along the back side of the vane 36 as water flows up ramp 48 and over drum 34A thereby driving rotation of drum 34A about its axle. Cup-like vanes 36 are only deployed during a power stroke portion or about the upper one-fourth to one-third or more of rotation of drum 34A and are otherwise in a stowed position throughout the remaining two-thirds to three-quarters of the rotation of drum 34A about its axle.

Figure 12:
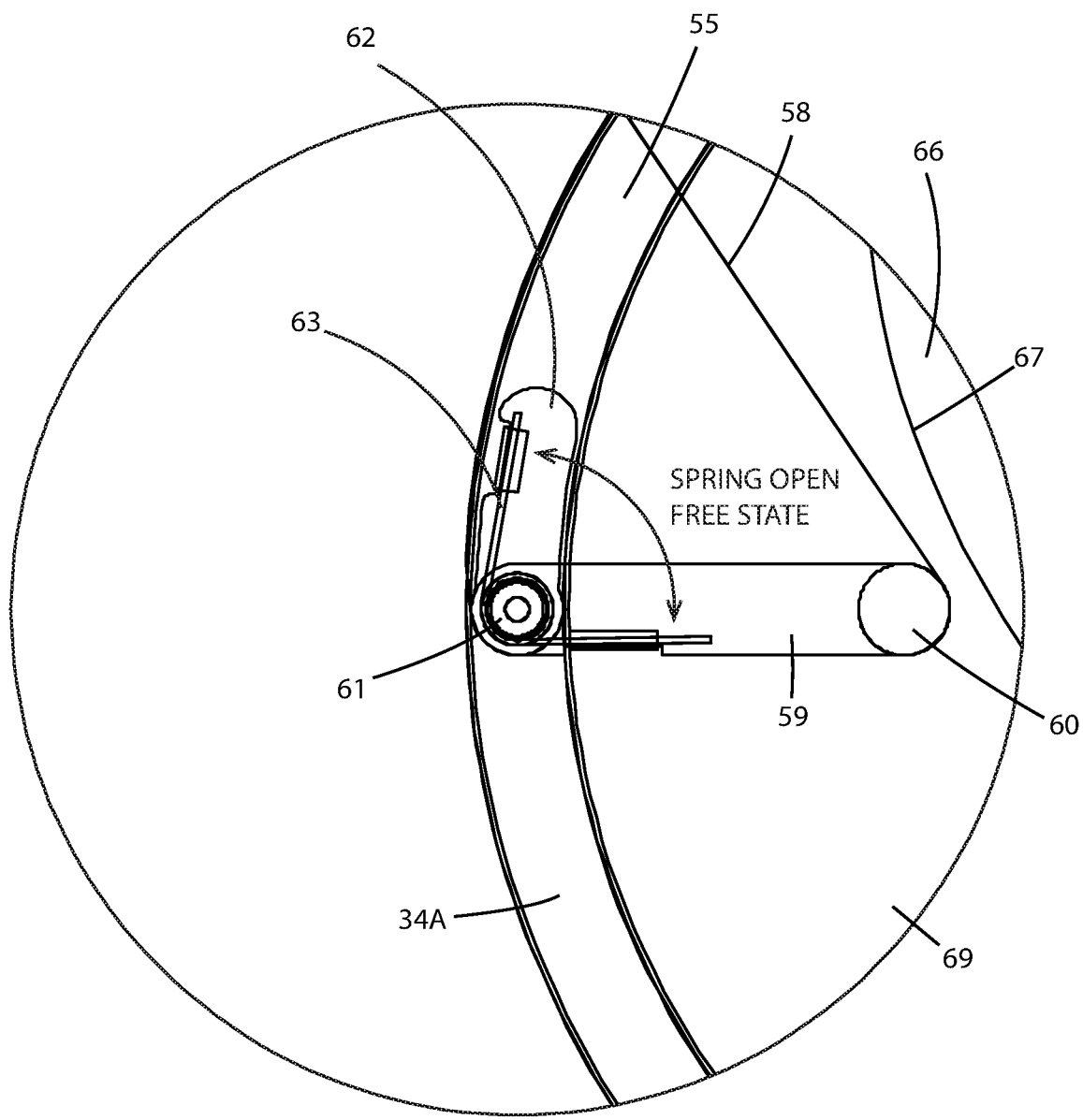
FIG. 12 is an enlarged detail view of the area identified in FIG. 8 showing the vanes in a closed position.
Figure 13:
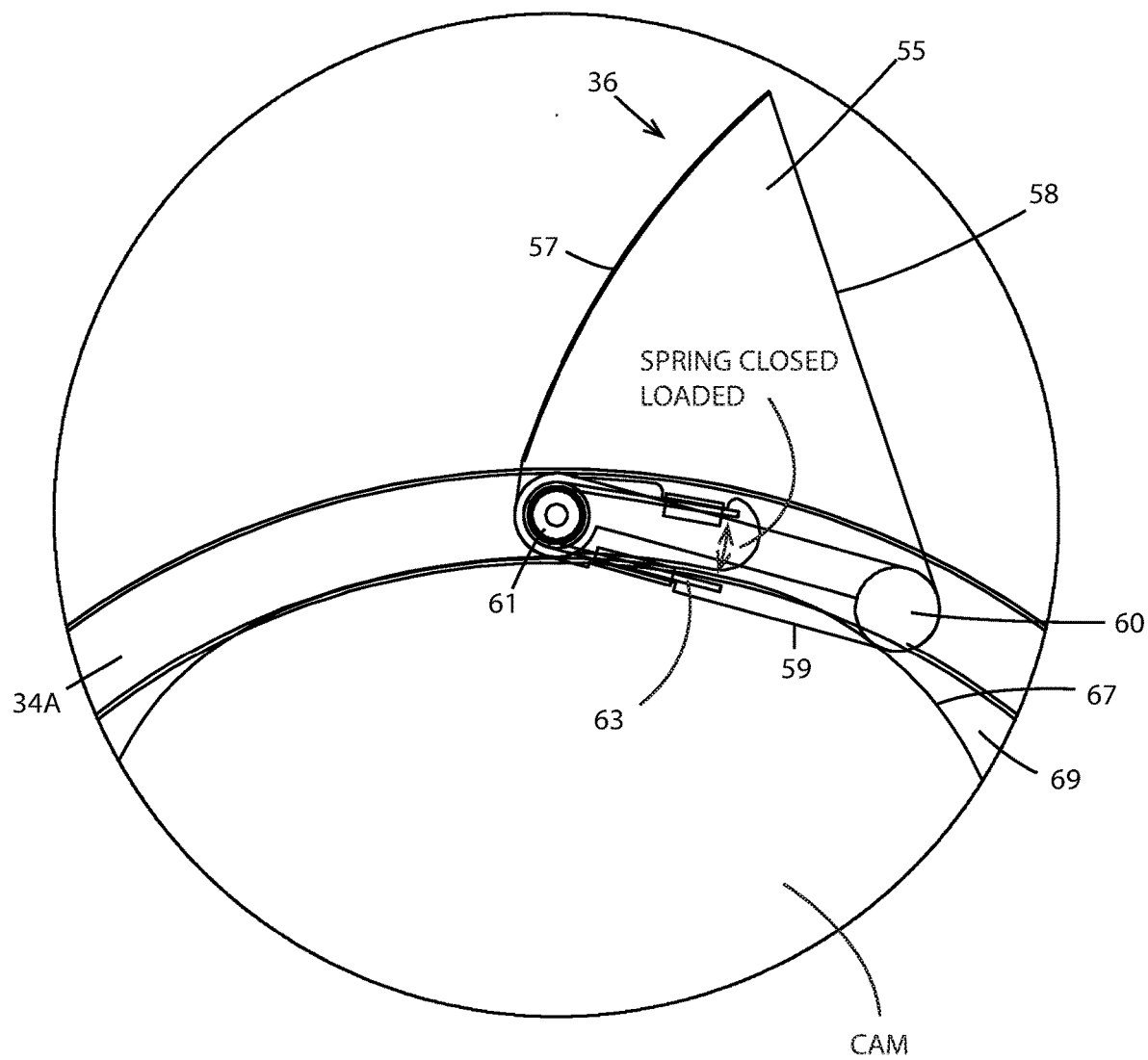
FIG. 13 is an enlarged detail view of the area identified in FIG. 8 showing the vanes in a deployed position.

Deployment of vanes 36 can be accomplished through a stationary cam 64 installed transversely outward of the end of drum 34A. Stationary cam 64 takes a generally inverted tear drop shape or guitar pick shape with a wider upper portion 65 and a narrower lower portion 66. Stationary cam 64 interacts with vanes 36 on the guide edge 59 of vane 36. A first roller bearing 60 and a second roller bearing 61 are positioned along the guide edge 59. First roller bearing 60 further defines a hinge that allows vanes 36 to rotate about an axis between stowed and deployed positions. As vanes 36 approach the power stroke zone of rotation, defined as approximately the upper one-fourth to approximately one-third of the rotation of drum 34A, second roller bearing 61 makes contact with the outer edge 67 of stationary cam 64 about the mid-line of stationary cam 64. As drum 34A continues to rotate, the second roller bearing 61 is now guided by outer edge 67 of stationary cam 64 and causes vanes 36 to rotate out of the stowed position to the fully deployed position as vanes 36 enter the power stroke zone of rotation. As vanes 36 enter the power stroke zone of rotation, first roller bearing 60 also contacts outer edge 67 of stationary cam 64 and in connection with second roller bearing 61, both roller bearings 60, 61 guide vanes 36 through the power stroke zone of rotation while maintaining contact with outer edge 67 of stationary cam 64. As vanes 36 move out of the power stroke zone of rotation, first roller bearing 60 disconnects from the outer edge 67 of stationary cam 64 while second roller bearing 61 maintains contact with the outer edge 67. As the vane 36 completely exits the power stroke zone of rotation, second roller bearing 61 loses contact with outer edge 67 of stationary cam 64 and vane 36 is returned to the fully stowed position through use of both water pressure behind drum 34A and slight influence from a spring bracket 62 disposed on guide edge 59 of vane 36 and a torsion spring 63 contained within spring bracket 62. As best seen in FIGS. 12 and 13, when vanes 36 are fully stowed, as shown in FIG. 12, the torsion spring 63 is maintained within spring bracket 62 in its open and free state. When vanes 36 are fully deployed, as shown in FIG. 13, torsion spring 63 is fully compressed within spring bracket 62 and is held open by both stationary cam 64 and by water pressure on the upstream edge 58 and upstream side of vane rear wall 57. This system allows vanes 36 to only be deployed through the power stroke zone of rotation whereby vanes 36 can catch the highest volume of water flowing over drum 34A and thereby drive rotation of drum 34A. By stowing vanes 36 throughout the remaining two-thirds to three-fourths of the rotation of drum 34A, drag and turbulence behind and beneath drum 34A is minimized and becomes negligible in the power generation. Although some resistance is inherent in the interaction between cam 64 and roller bearings 60, 61 in the form of friction, as well as in the interaction between vanes 36 and torsion spring 63, the total of this resistance is significantly less than the turbulence and drag present in prior art systems, thus making energy generating device 20 more efficient than prior art generators. In systems having more than four vanes 36, configurations are possible that allow two or more vanes to be within the power stroke zone of rotation at one time to provide additional torque and power improvements from a similarly sized system or to provide similar torque and power outputs from a system with a smaller overall size and footprint. The defined distance of transverse gap 54 need not provide clearance for the full length of vanes 36 as seen in prior art, but instead the size of transverse gap 54 can be less than the total height or length of vanes 36. The smaller gap provides for less water flowing down over the downstream edge 49 of ramp 48 thereby reducing the volume of water traveling through vertical gap 68 flowing under drum 34A. As vanes 36 are stowed through this section, water flowing through vertical gap 68 is unresisted and the difference in volume between water flowing through vertical gap 68 under drum 34A and the higher volume of water flowing over drum 34A and through the power stroke zone can create a pressure differential possibly invoking Bernoulli's Principle which, if fast enough, may create some lift or upward force. Additionally, the smaller transverse gap 54 can cause the flow rate of water flowing under drum 34A through vertical gap 68 to increase which may cause that water becoming turbulent depending upon the input speed of the water. In that instance, turbulent water would help reduce friction along the bottom of drum 34A through gap 68 which would lead to an overall increase of rotation speed of drum 34A. Furthermore, having vanes 36 stowed at the bottom of drum 34A allows vertical gap 68 to be shorter, which can make energy generating device 20 shorter overall and lowers the center of gravity of energy generating device 20, making the unit more stable.

With reference to FIGS. 2-11 and 14-16, energy generating device 20 can have a spoiler 38 that substantially defines the top side 30 of the energy generating device 20. Spoiler 38 has an upstream edge 39 that is slightly curved upwards and slightly wider than remainder of spoiler 38. The upward curve and slight increase in width of upstream edge 39 helps direct water flow through the energy generating device 20 and over drum 34 in a manner that allows vanes 36 to properly catch the water as it flows beneath the spoiler 38 and above drum 34A. Spoiler 38 is spaced vertically above deployed vanes 36 with minimal clearance in order to maximize the volume of water captured by vanes 36 as it passes through the energy generating device 20. This configuration keeps water pressure on vanes 36 and prevents water from spilling over vanes 36 thereby maximizing output of the system.

Figure 2:
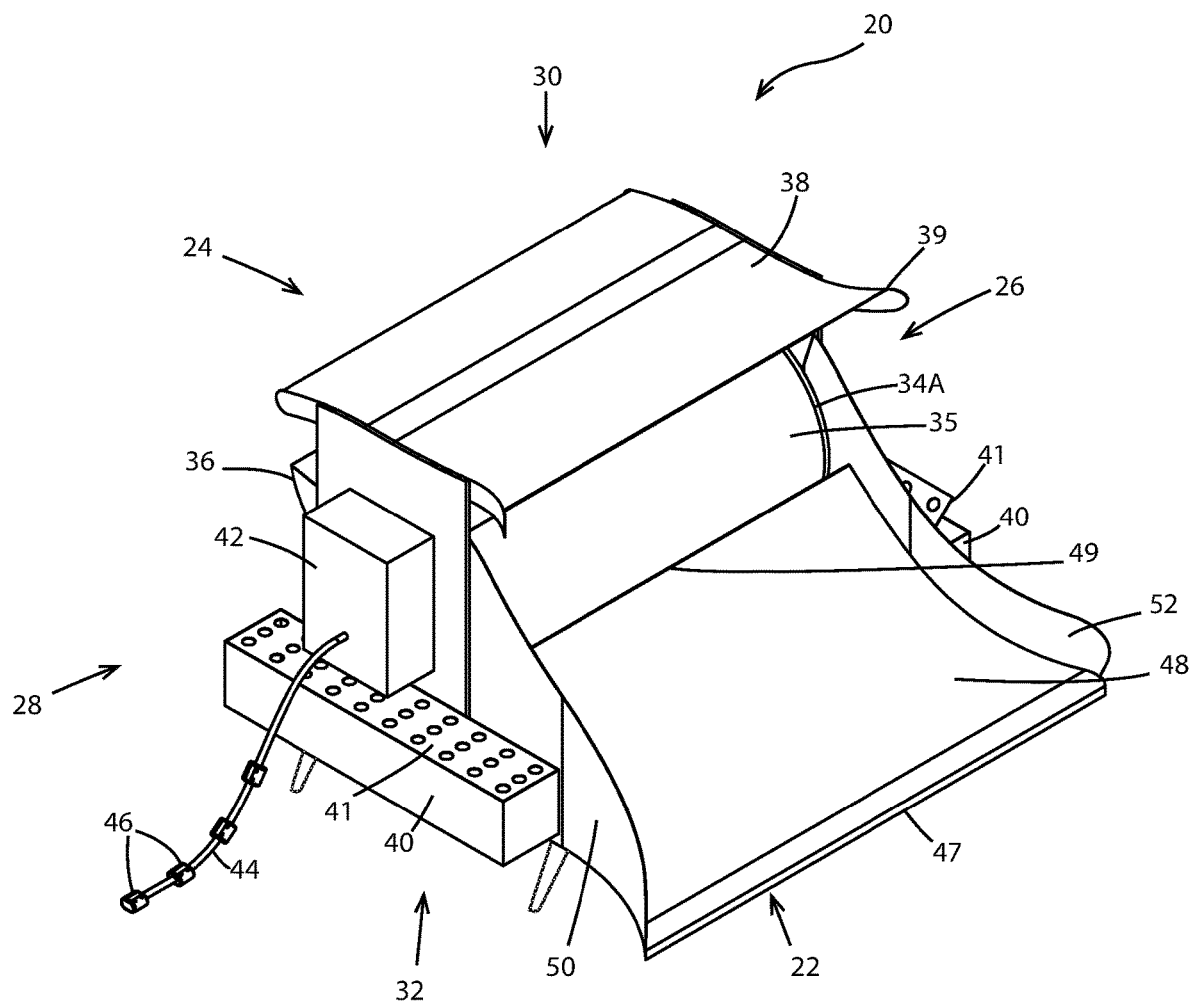
FIG. 2 is a perspective view from the upper left front of the described device.
Figure 3:
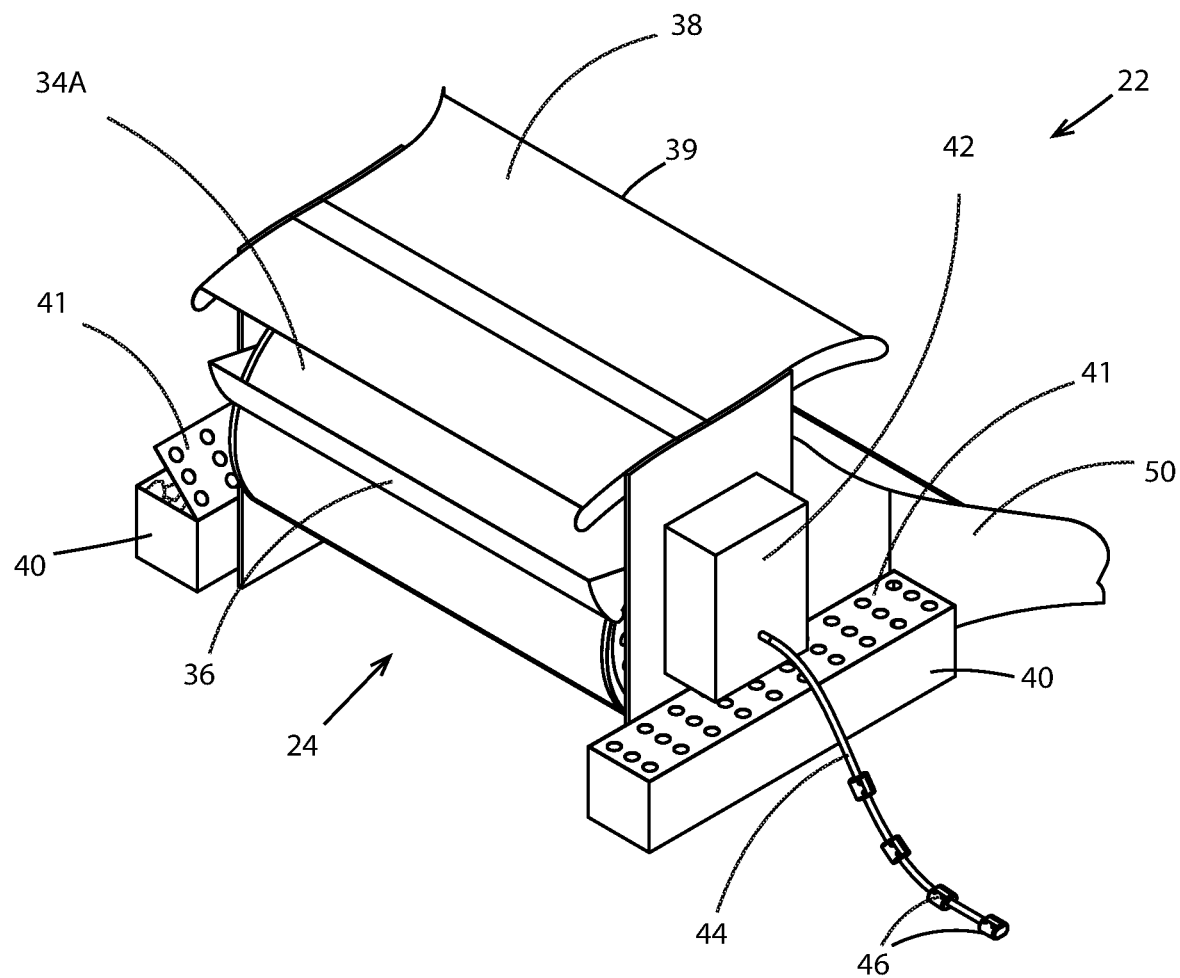
FIG. 3 is a perspective view from the upper left rear of the described device.
Figure 4:
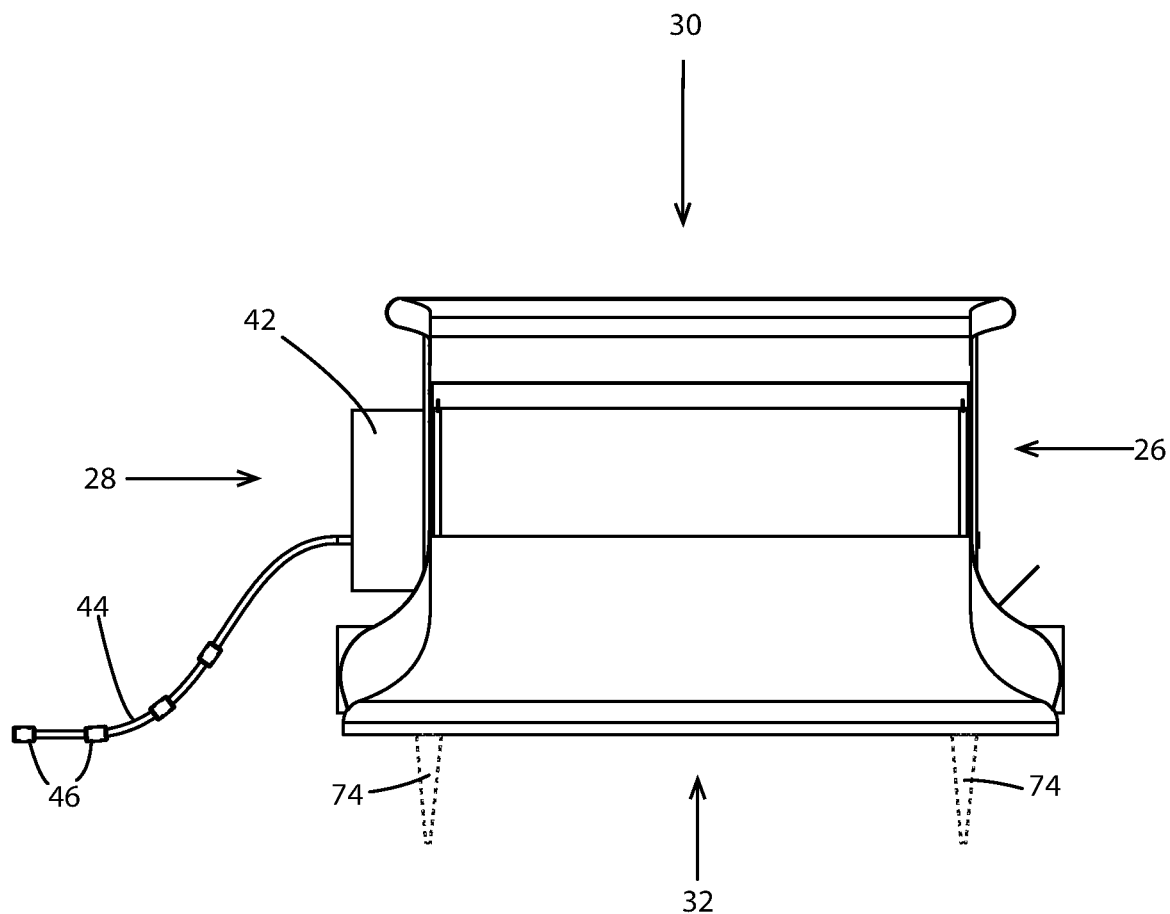
FIG. 4 is a front elevation view of the described device.
Figure 5:
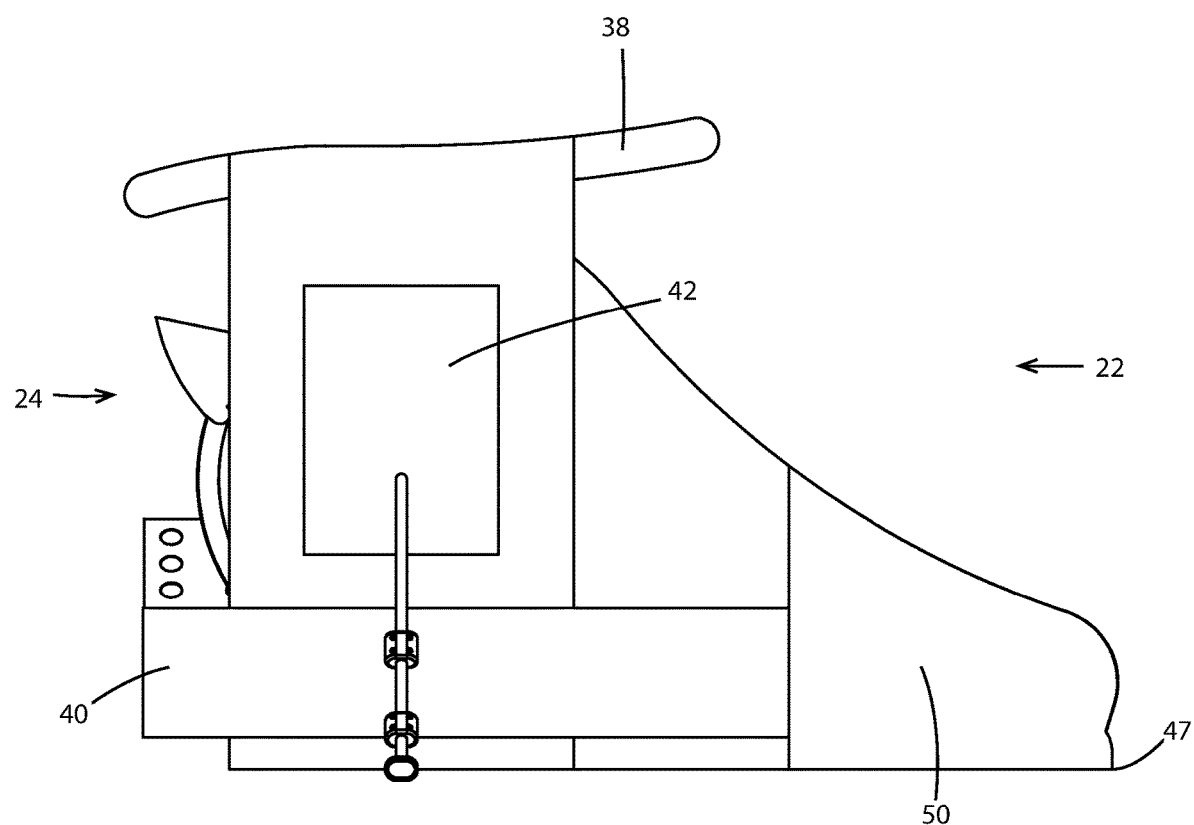
FIG. 5 is left side elevation view of the described device.
Figure 6:
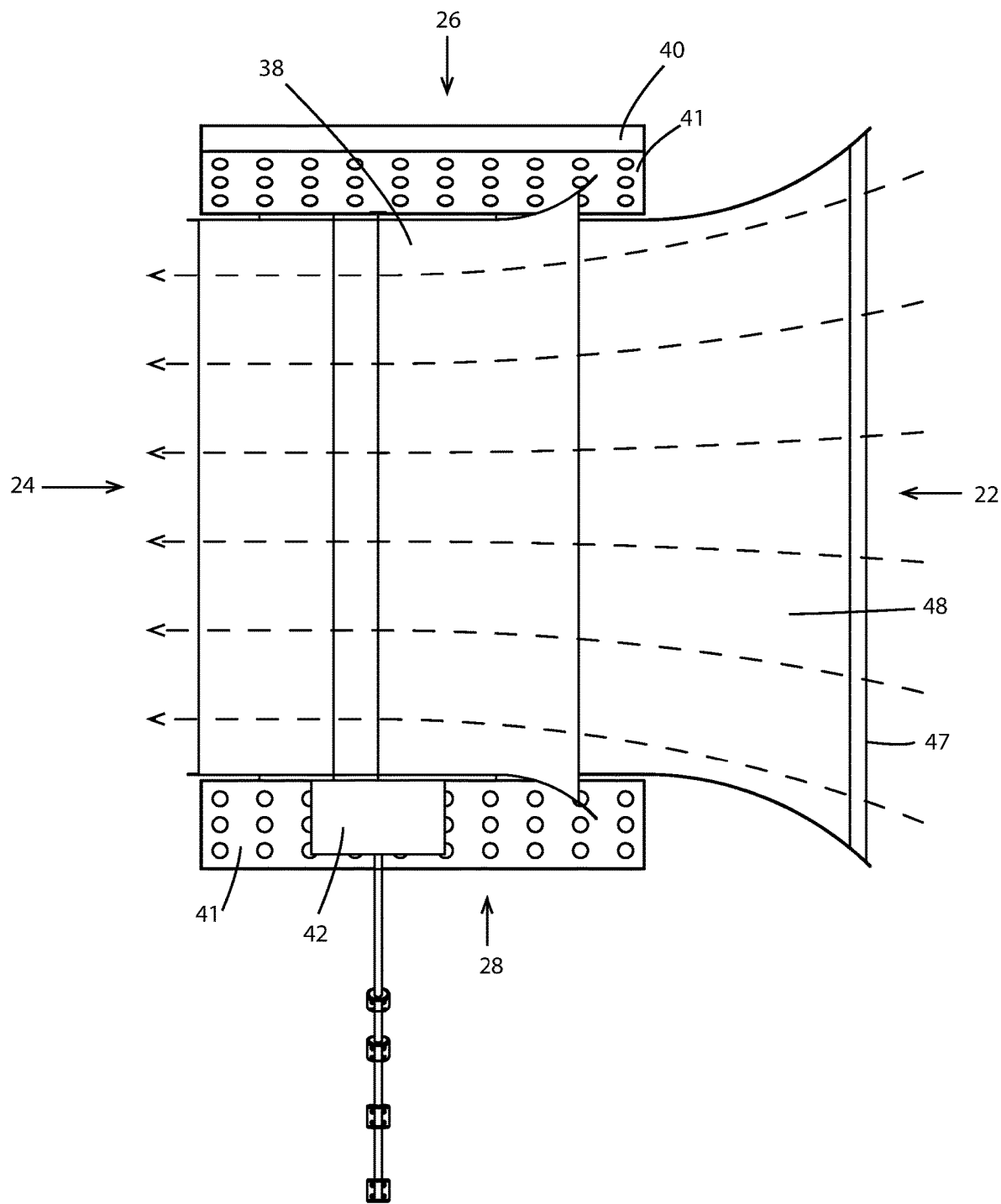
FIG. 6 is a top plan view depicting a flow analysis of the described device.
Figure 7:
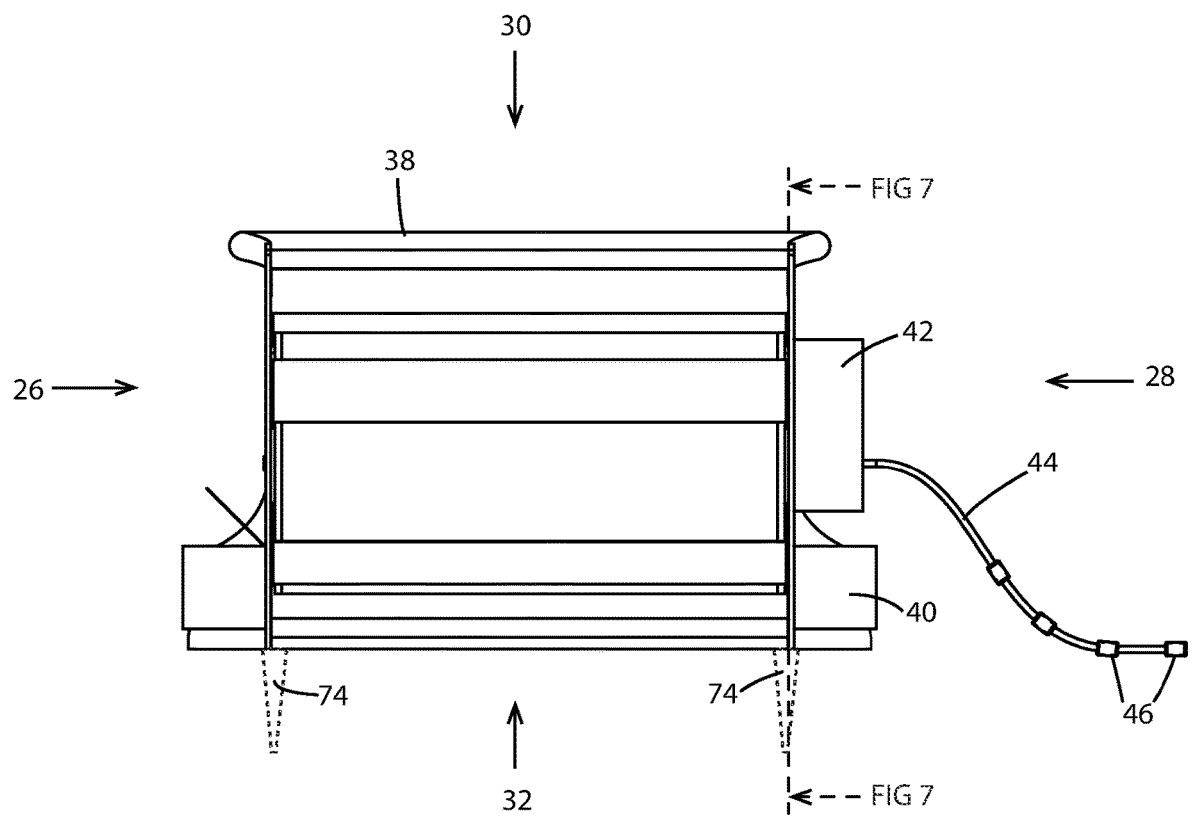
FIG. 7 is a rear elevation view of the described device.
Figure 8:
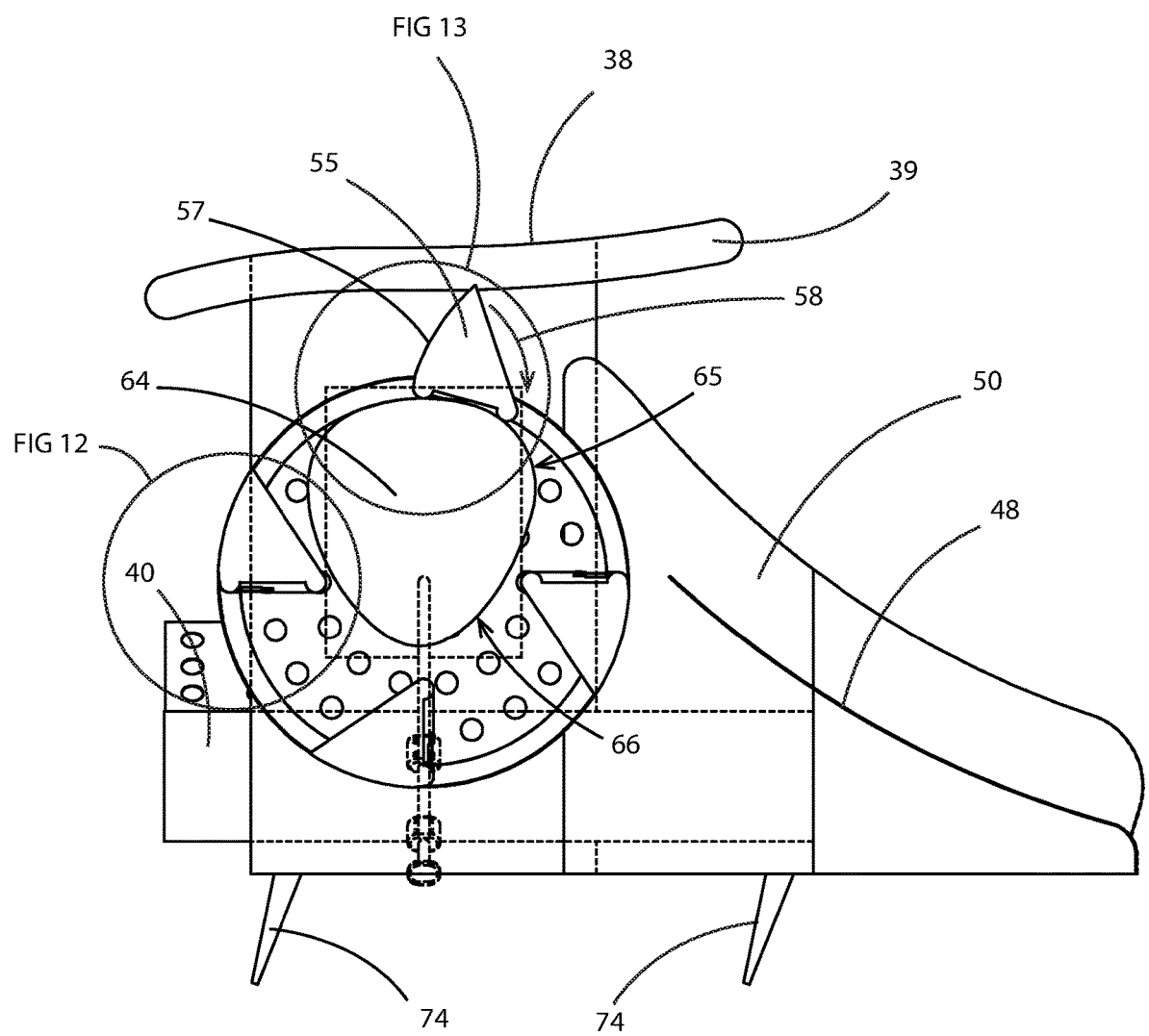
FIG. 8 is a longitudinal cross section view taken along the axis identified in FIG. 7.

With reference to FIGS. 2-11 and 14-15, but as best seen in FIGS. 2 and 3, the energy generating device 20 can have one or more ballast boxes 40 located adjacent to the first side 26, the second side 28, or both the first and second side 26 and 28, or may be located in any other location suitable for the desired application. Ballast box 40 can have a lid 41, which can be a perforated lid 41, which can allow water and air to flow in or out of ballast box 40 to reduce buoyancy of energy generating device 20 and help secure energy generating device 20 on the bottom of the associated body of water in which it is placed. According to another aspect, ballast box 40 can be perforated. Ballast box 40 can be filled with any heavier than water substance including river rocks, bricks, or even cured cement. According to one aspect, river rocks or bricks could be removable and adjustable allowing the weight and weight distribution of energy generating device 20 to be adjusted appropriate to the desired installation and application conditions.

With reference to FIGS. 2-9 and FIG. 15, energy generating device 20 can have one or more generators 42 installed on the first side 26, second side 28, or first and second side 26 and 28. Generator 42 can be of any type chosen by a person of skill in the art suitable for the desired application. Generator 42 consists generally of a device known to convert rotational energy from drum 34A to electrical energy which is then broadcast out and away from generator 42 via power cord 44 which can travel out of the associated body of water and into the desired end application. Power cord 44 can include weights 46 which serve to keep power cord 44 stationary along the bottom of the associated body of water to prevent snagging or catching on passing debris and to prevent or minimize interaction between power cord 44 and any wildlife present in the associated body of water.

Figure 10:
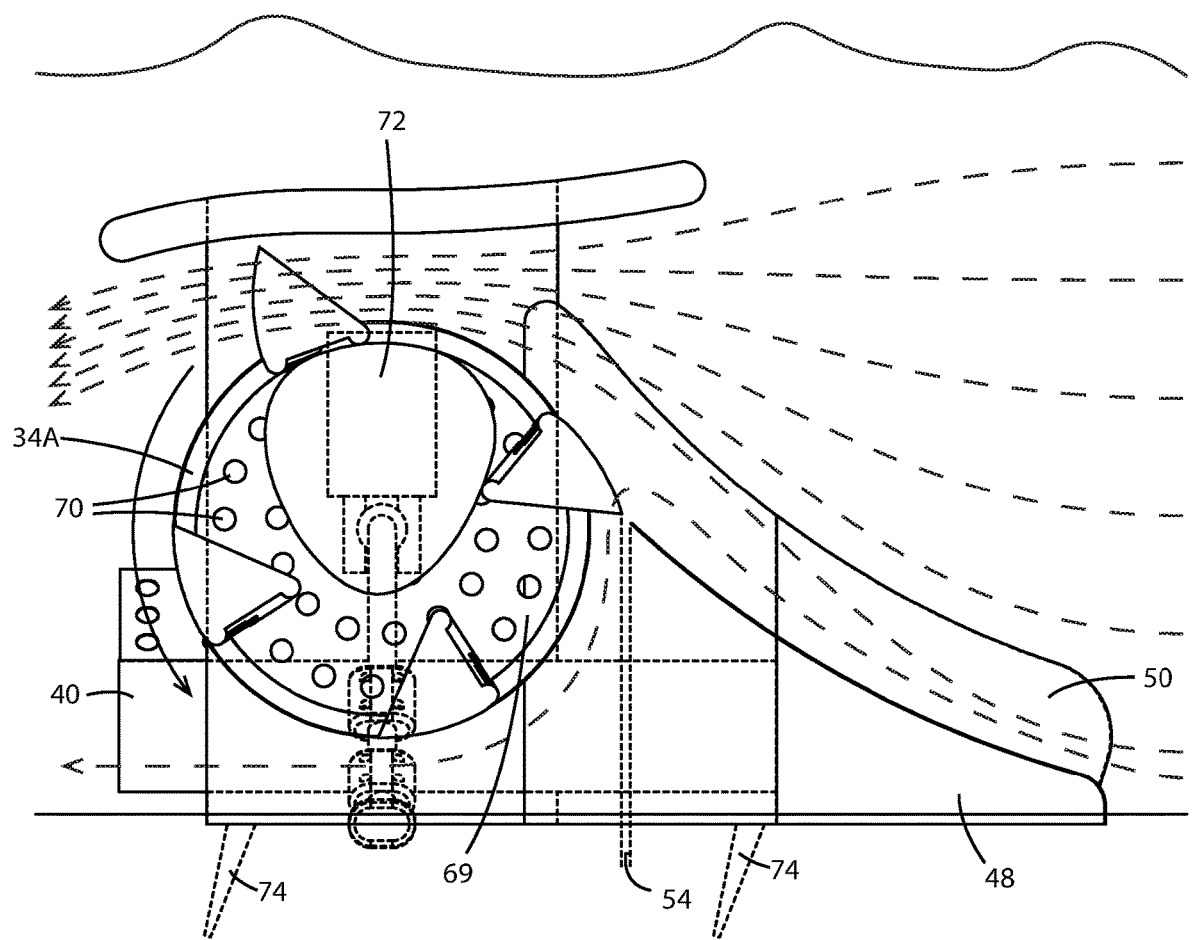
FIG. 10 is a longitudinal cross section view depicting an alternative embodiment of the described device.
Figure 11:
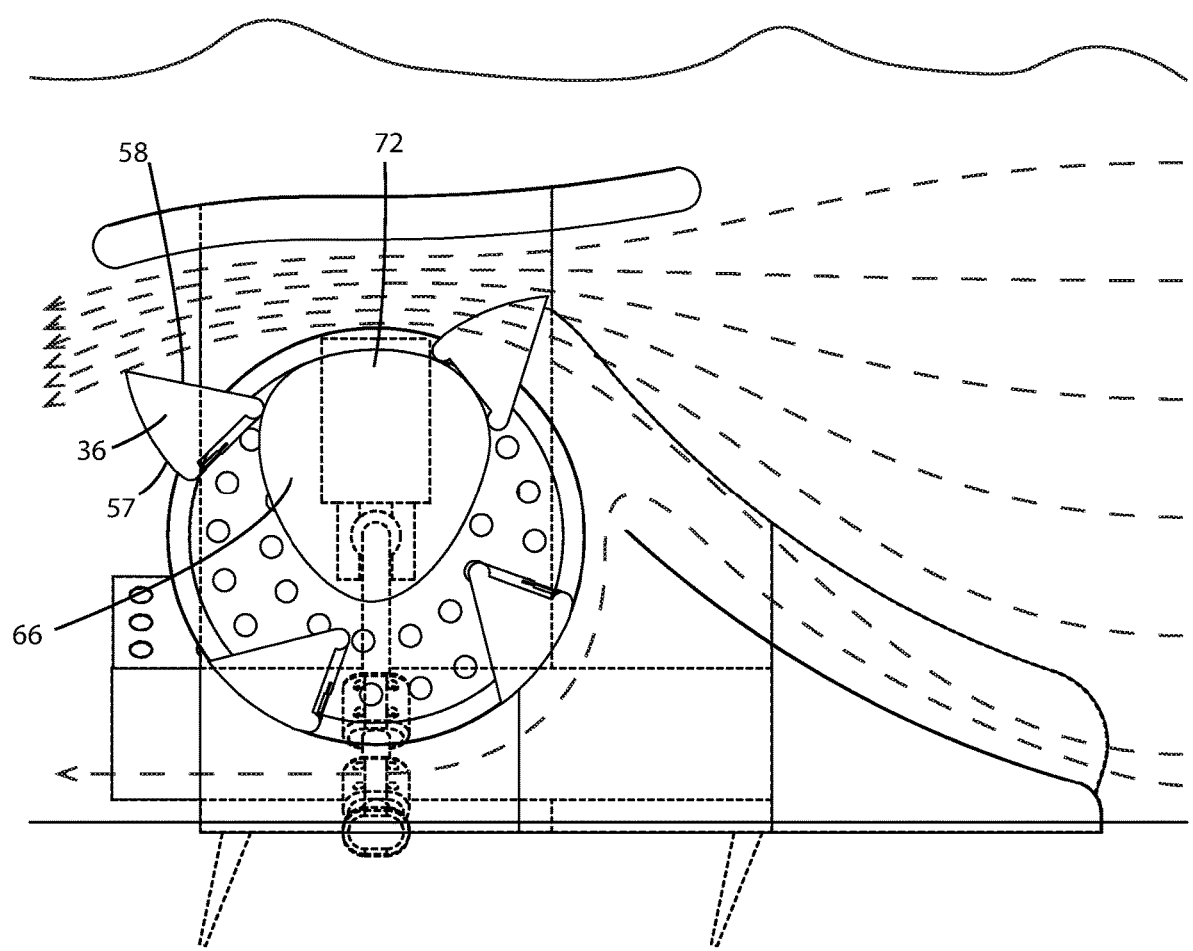
FIG. 11 is a longitudinal cross section view depicting alternative embodiment showing a different position of the drum and cycle and vane positioning control.
Figure 14:
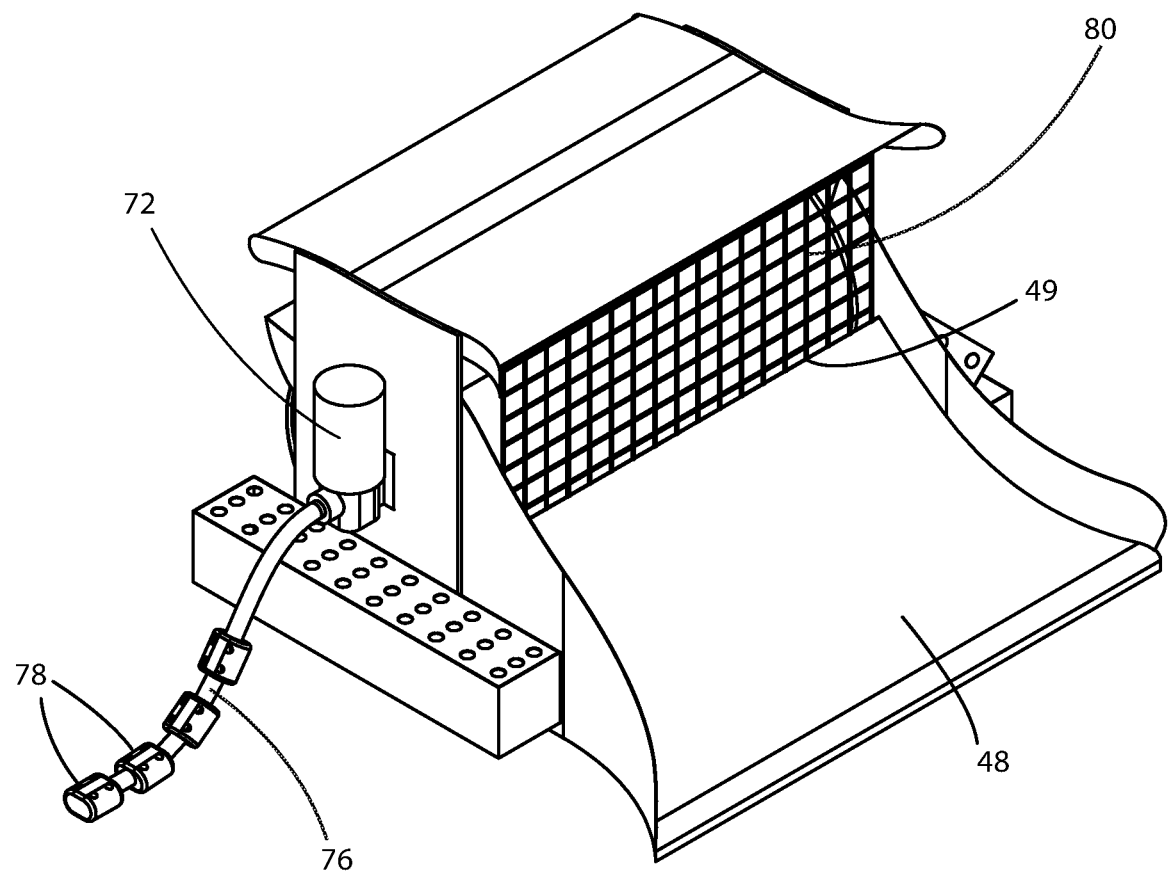
FIG. 14 is a perspective view from the upper left front side showing an optional debris grill embodiment.

With reference to FIGS. 10, 11, and 14, generator 42 and power cord 44 can be replaced by a mechanically driven pump 72 such as a water pump as seen in FIG. 14. The mechanically driven pump 72 can be of any type chosen by a person skilled in the art suitable for the desired application but is generally a pump able to harness rotational energy of drum 34A to directly drive the pump. One such example could be a water pump which can deliver water from the associated body of water in which energy generating device is placed through water hose 76. According to this aspect, water hose 76 can include water hose weights 78 which, much like power cord weights 46, serve to keep water hose 76 stationary on the bottom of the associated body of water and to minimize interaction between water hose 76 and wildlife present in the associated body of water.

With reference to FIGS. 4, 7, 10, and 1a, the energy generating device 20 can include one or more anchors 74 which can be buried in the bottom surface of the associated body of water. Anchor 74 can be spade-shaped and/or angled or otherwise configured in such a manner to resist movement of energy generating device 20. The addition of anchor 74 can be especially important during periods of high flow rate for associated body of waters. For example, during periods of heavy rainfall or snowmelt runoff, rivers can increase their flowrate by a factor of two or more times and anchor 74 can help keep the energy generating device 20 from shifting or moving along the bottom of a river during these times.

With reference to FIG. 14, an optional grill 80 can be installed upstream of drum 34A and secured to the underside of spoiler 38 and/or the rear downstream edge 49 of ramp 48. Alternatively, grill 80 can be secured to sides 26 or 28 of the energy-generating device. Optional grill 80 can help deflect or remove debris from the water flow thereby minimizing the impact of waterborne debris entering the energy generating device 20 and damaging or otherwise affecting the operation of energy generating device 20. According to one aspect, grill 80 can be angled or slanted to one or both sides 26 and 28 of energy generating device 20 to further assist in deflecting debris. Grill 80 can be of varying mesh size as to catch or deflect debris of varying size depending upon the characteristics of the body of water in which energy generating device 20 is installed. According to another aspect, grill 80 can be configured to prevent wildlife from entering the water flow passing through energy generating device 20.

Figure 15:
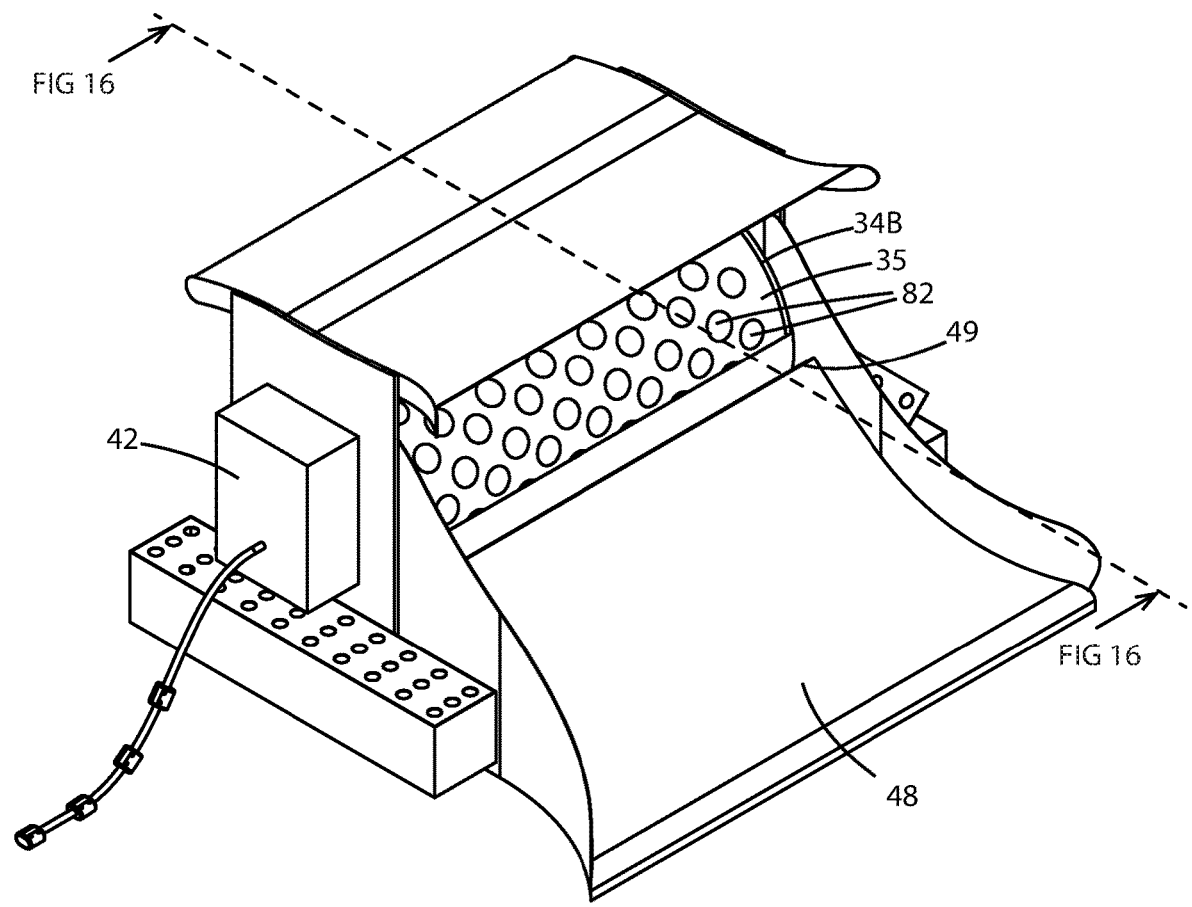
FIG. 15 is a perspective view from the upper left front side showing an alternate embodiment of the drum.
Figure 16:
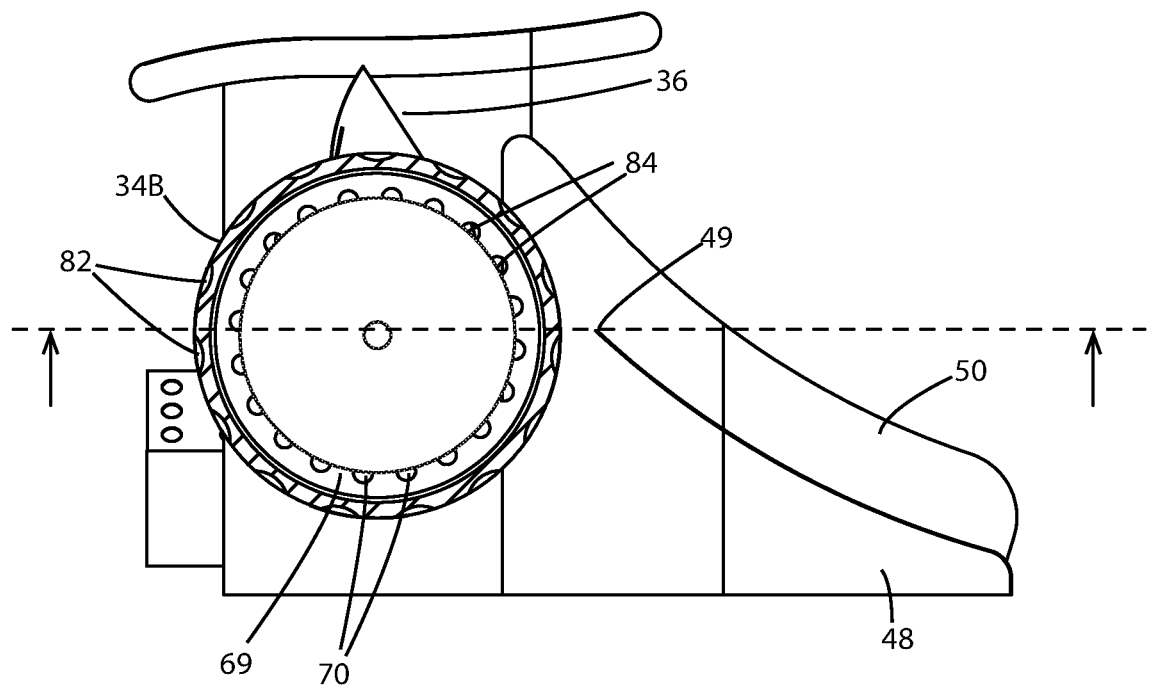
FIG. 16 is a longitudinal cross section view taken along the axis identified in FIG. 15.
Figure 17:
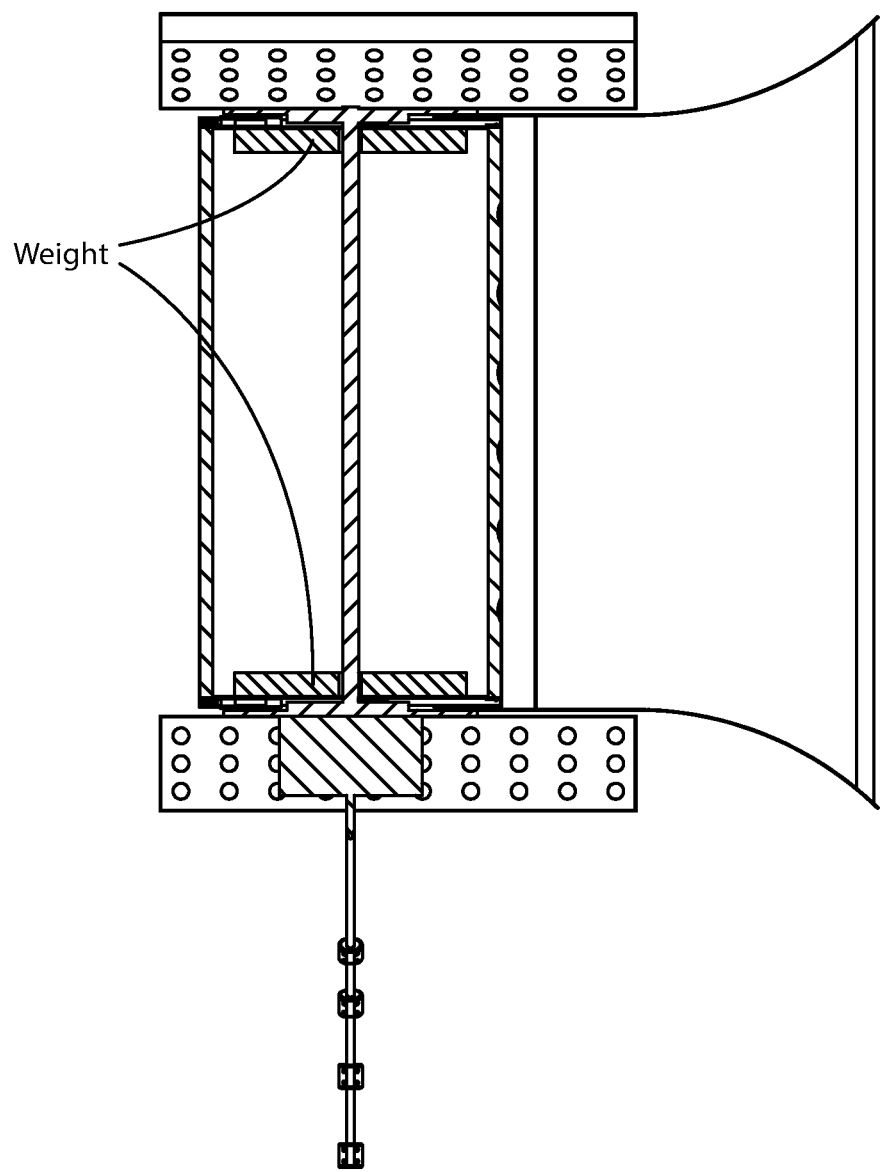
FIG. 17. is a cross section view taken along the axis identified in FIG. 16.

With reference to FIGS. 15-17, an alternative embodiment of drum 34A is shown and labeled drum 34B. Drum 34B can have all or substantially all of the same characteristics and configurations as drum 34A. However, drum 34B can also include one or more dimples 82 on the outside surface 35B of drum 34B. These dimples 82 can serve to further decrease drag as water flows over and around drum 34B much like the way air drag is reduced on the surface of a dimpled golf ball. The dimpled drum 34B could disrupt the boundary layer of water that clings to the outside surface 35B of drum 34B as water passes around and over drum 34B.

With reference to FIGS. 16 and 17, FIG. 16 shows a cutaway side view of the energy generating device 20 along the line identified in FIG. 15 and FIG. 17 shows a cutaway overhead view along the line identified in FIG. 16. Shown interior of drum 34B are optional flywheels 84. One or more of these optional flywheels 84 can be installed inside the drum 34B to add both weight and stability to energy generating device 20. Flywheels 84 can serve as ballast to further secure energy generating device 20 on the bottom of the associated body of water, but flywheels 84 can also serve the purpose of dampening vibration and helping maintain smooth and even rotation of drum 34B despite uneven flow surges or flutters in the rotation stroke of drum 34B. Although shown in FIG. 16 in connection with drum 34B, flywheels 84 can be installed and utilized in an identical manner in drum 34A. Flywheels 84 can be constructed out of a thick metal plate and disposed in one or both ends of drum 34A or drum 34B interior of the end caps 69. According to another aspect, one or more of the end caps 69 can be constructed to serve as both the end caps 69 and as flywheels 84. According to this aspect, end caps 69 can be thickened metal plates.

Figure 18:
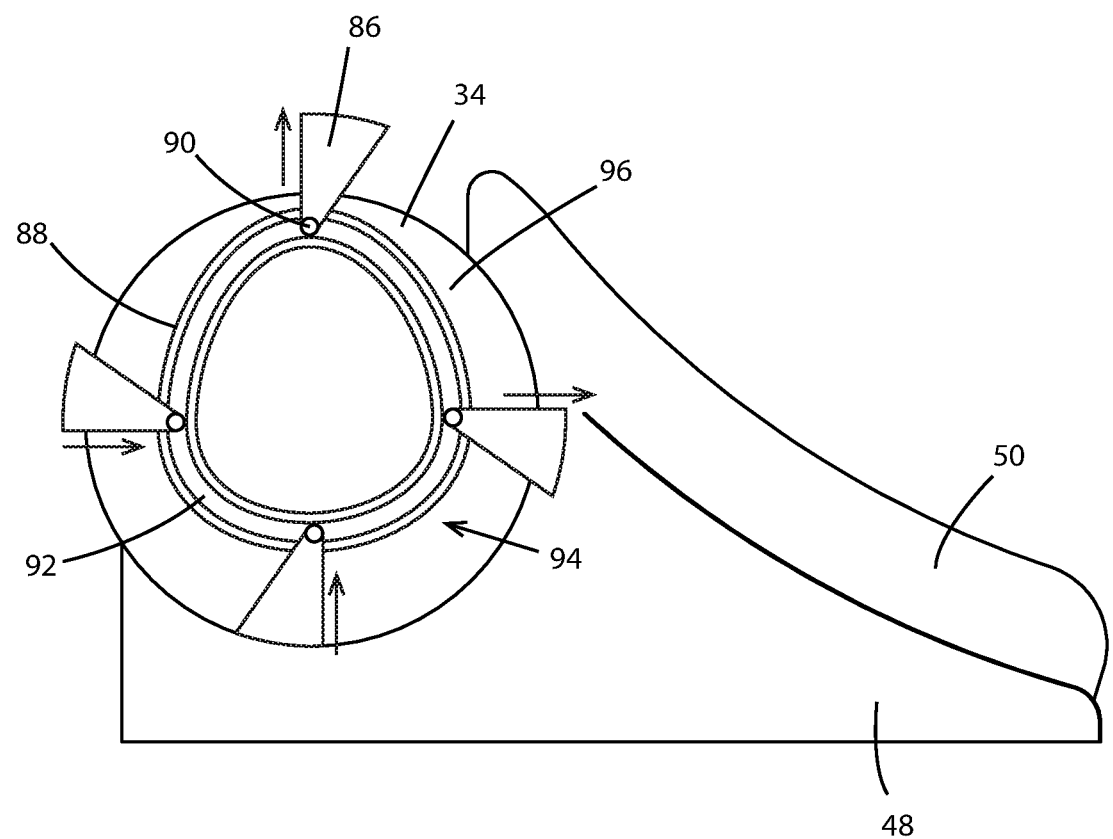
FIG. 18 is a left side elevation view of an alternative embodiment of the described device.
Figure 19:
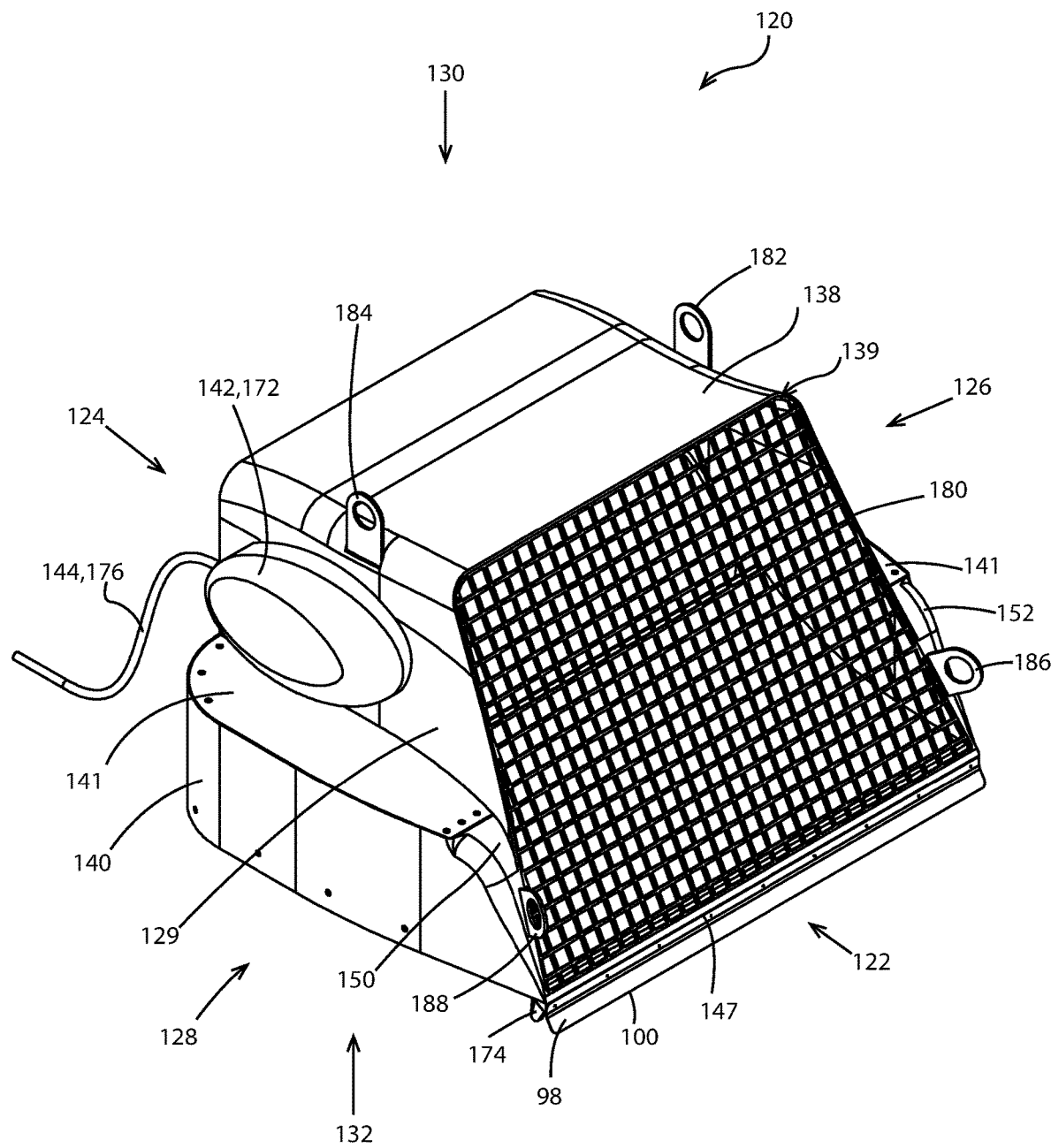
FIG. 19 is a perspective view from the upper left of an alternate embodiment of the described device.
Figure 20:
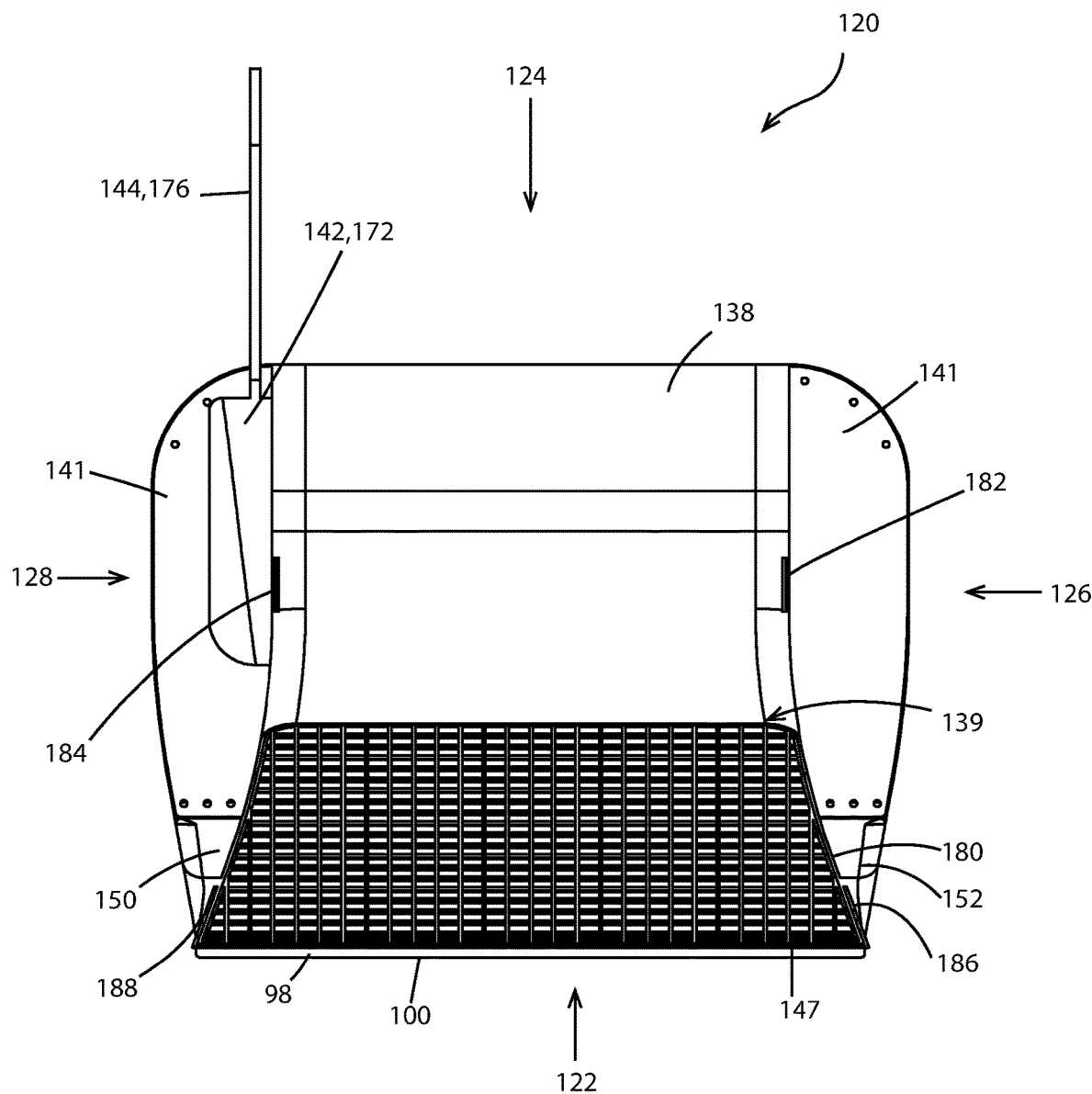
FIG. 20 is a top plane view of the alternate embodiment of the described device.

With reference to FIG. 18, an alternative embodiment of the vanes 36 and stationary cam 64 is shown. As depicted in FIG. 18, vanes 86 and precision cam 88 can replace vanes 36 and stationary cam 64, respectively. According to an aspect of this disclosure, vanes 86 do not rotate in and out of the deployed and stowed positions. Rather, vanes 86 articulate through use of a single roller bearing 90 which follows a track 92 formed in the precision cam 88. As compared to stationary cam 64, precision cam 88 is substantially shaped as an inverse of stationary cam 64 in that the lower portion 94 is wider than the upper portion 96 of precision cam 88. As can be seen in FIG. 18, as drum 34A or 34B rotates, articulated vanes 86 travel around the precision cam 88 and are fully deployed during the top one-fourth to one-third of the rotational cycle and are retracted during the remaining two-thirds to three-quarters of the rotational cycle. According to this embodiment, the articulated vanes 86 can begin to deploy before reaching the power stroke zone of rotation. Although this method of deployment can cause the transverse gap 54 between the downstream edge 49 of ramp 48 and the outside surface 35 of drum 34A or 34B to be slightly increased, the articulating vanes 86 can effectively block water flow as they deploy through this small portion of the rotation. This embodiment still substantially stows vanes 86 throughout the non-power stroke portions of the rotation of the drum 34A or 34B so the added effects of having a slightly larger transverse gap 54 are negligible. According to a further aspect vanes 86, although only four are shown in FIG. 18, can likewise be modified in number and position according to the desired application of energy generating device 20 without deviating from the scope of the disclosure herein.

Figure 23:
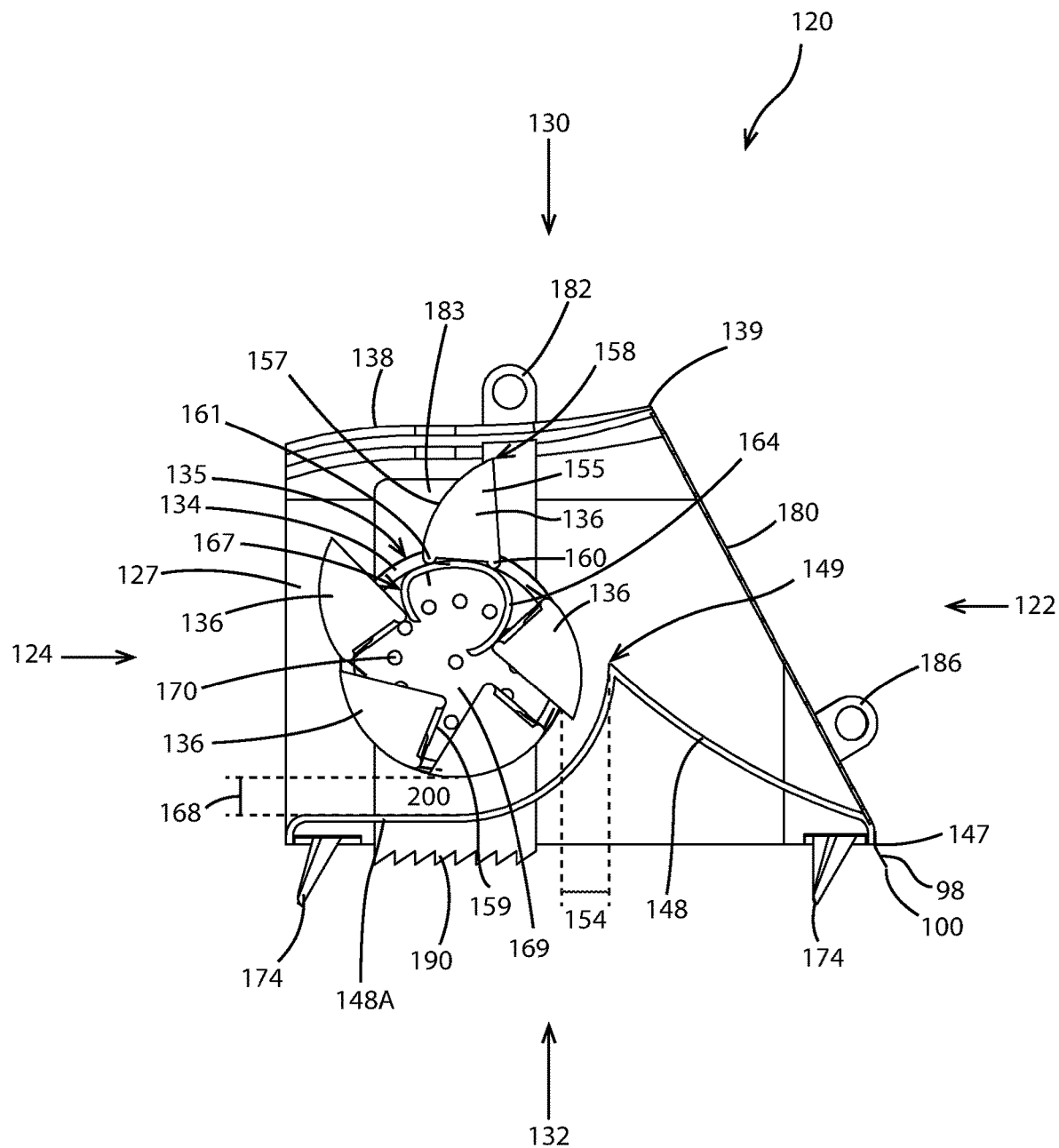
FIG. 23 is a cross-section view of the alternate embodiment taken along the axis identified in FIG. 22.
Figure 24:
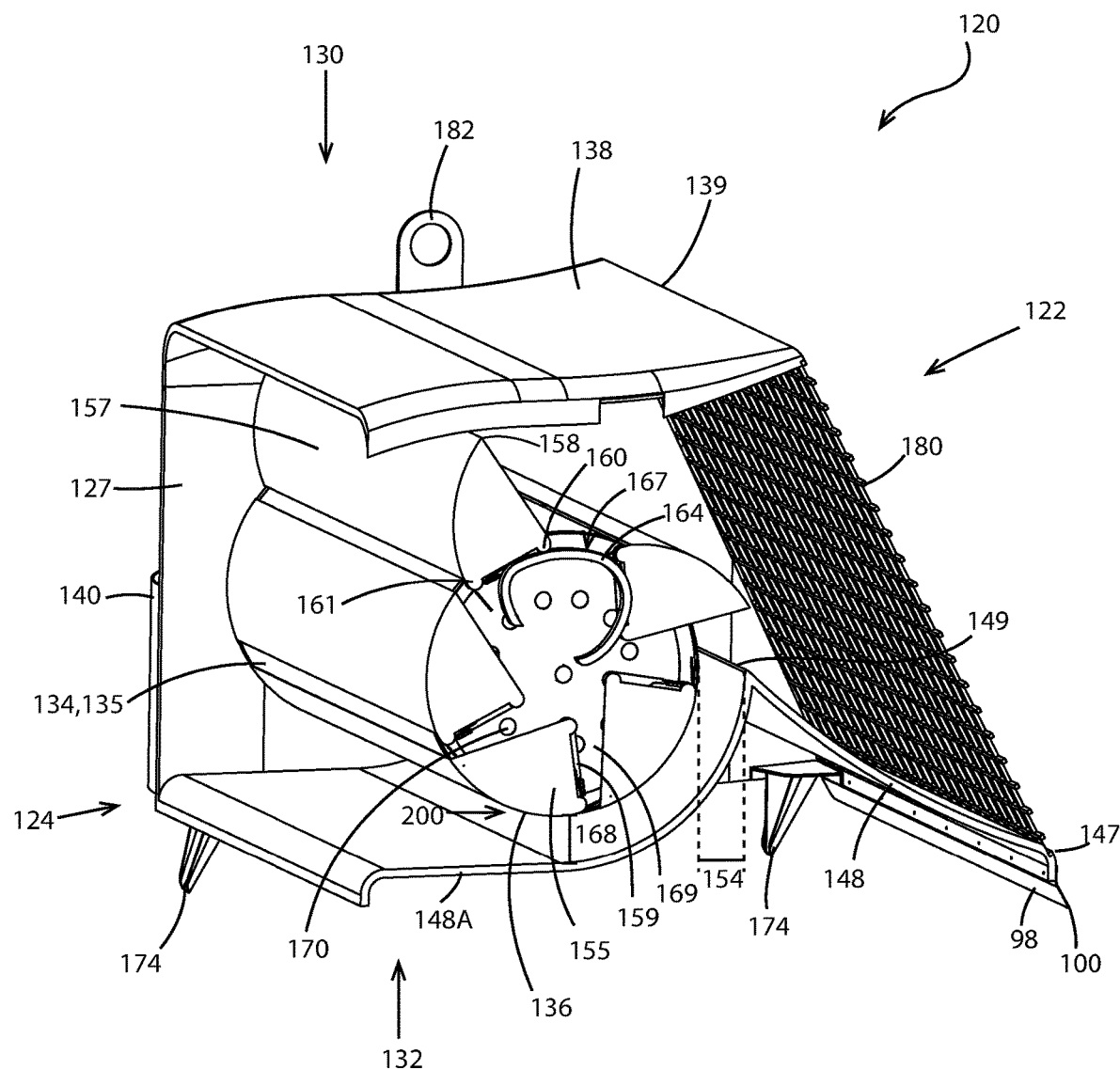
FIG. 24 is a perspective view from the left rear of the cross-section shown in FIG. 23.
Figure 25:
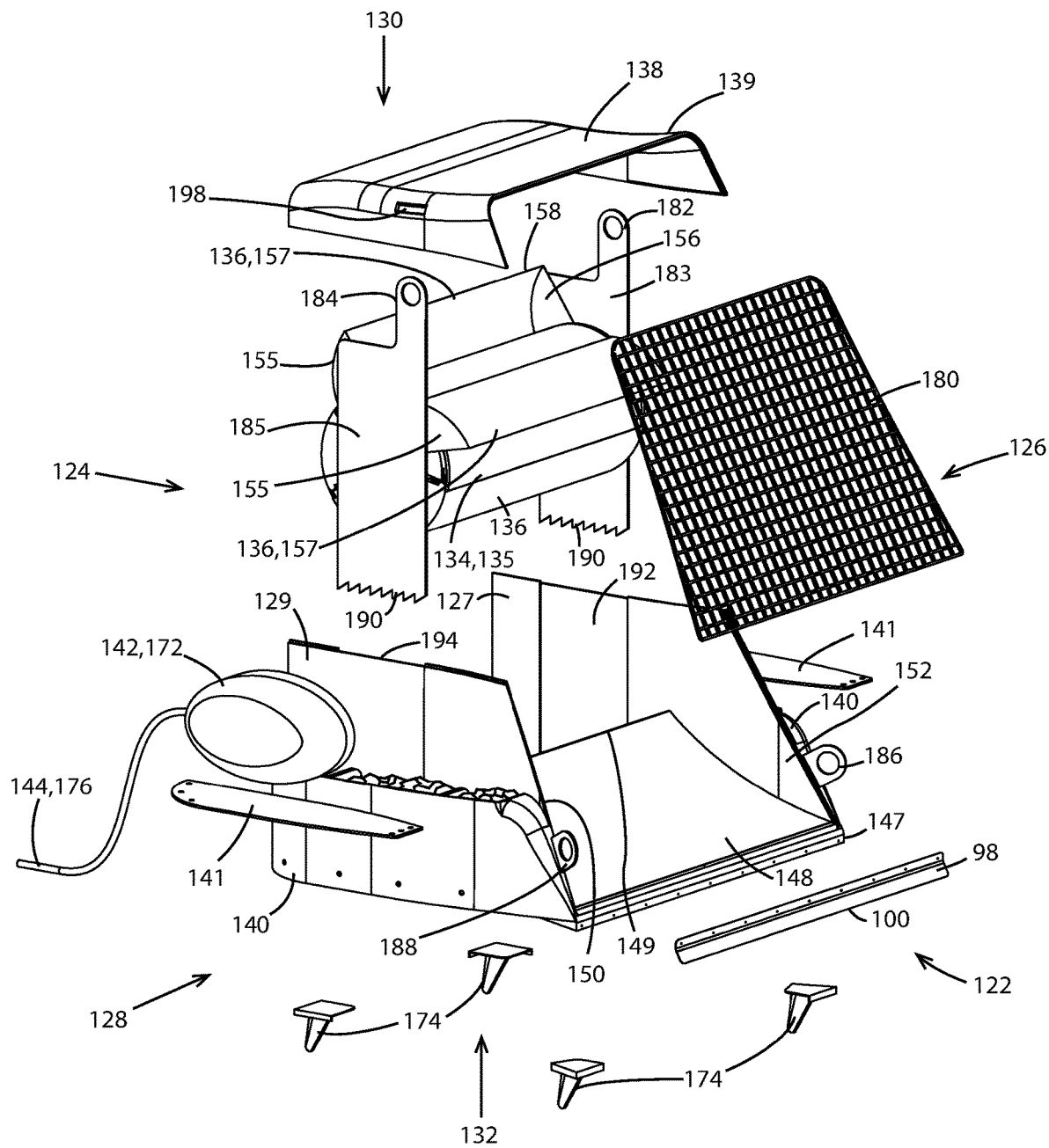
FIG. 25 is an exploded view of the alternate embodiment of the described device.

With reference to FIGS. 19-25, an alternative embodiment of energy generating device 20 is shown and generally indicated as energy generating device 120. Energy generating device 120 can have substantially similar features as energy generating device 20 and as used throughout similar reference numbers referred to similar structures with an addition of 100 to the series of reference numbers indicating the alternative embodiment, as shown in FIGS. 19-25. For clarification and by way of example, first end or upstream end 122 of energy generating device 120 can correlate to first end or upstream end 22 of energy generating device 20. Energy generating device 120 can consist generally of similar structures as energy generating device 20 with the exception of the additional or modified features as disclosed herein. Energy generating device 120 can have a more hydrodynamic form without deviating from the general scope of disclosure herein. Energy generating device 120 can further include a first upper installation mount 182, a first installation mount body 183, a second upper installation mount 184, a second installation mount body 185, a first lower installation mount 186, a second lower installation mount 188, and one or more series of drag teeth 190. Energy generating device 120 can be modular as seen in FIG. 25 with sections of energy generating device 120 being interchangeable or adjustable according to the desired application of energy generating device 120. The body of energy generating device 120 can be constructed of a rigid or semi-rigid material, such as metal, plastic, fiberglass, or carbon fiber. According to one aspect, any metal parts of energy generating device 120 can be constructed of aluminum, steel, stainless steel, galvanized steel, or other metal chosen by a person of skill in the art that can offer both structural rigidity and anti-rust or anti-corrosion properties. According to one aspect, the body of energy generating device 120 can be constructed of fiberglass or carbon fiber.

According to one aspect, components of energy generating device 120 can be constructed and formed to add hydrodynamic properties to decrease drag and force on non-energy generating components of energy generating device 120. For example, generator 142 or mechanical pump 172 can take on an oval or elliptical shape or alternatively can be enclosed in an oval or elliptical shaped housing thereby reducing drag and turbulence created by water flowing over or past generator 142 or mechanical pump 172. Similarly, ballast box 140 and lid 141, which can also be a perforated lid 141, can take a hydrodynamic shape which can include tapering of the upstream end of ballast box 140 and lid 141. According to one aspect, ballast box 140 and lid 141 can be integrally formed with first sidewall 127, second sidewall 129, or first and second sidewalls 127, 129, respectively. Further, first sidewall 127 and second sidewall 129 can extend up and meet spoiler 138 such that drum 134 is fully enclosed within energy generating device 120 thereby reducing or preventing water loss through gaps in the first and second sidewalls 127, 129. According to another aspect, ballast box 140 can be perforated.

According to another aspect of the disclosure, upstream edge 47 of ramp 48 can include or consist of a rubber flap 98 that extends beyond the first and second ramp sidewalls 50, 52 which can allow the upstream edge 47 of ramp 48 to conform to the bottom of the associated body of water to prevent water from flowing underneath the ramp and subsequently underneath the energy generating device 20 as a whole. According to another aspect, rubber flap 98 can have a downward angle to substantially embed upstream edge 100 of rubber flap 98 into the bottom surface of the associated body of water. According to another aspect, upstream edge 100 of rubber flap 98 can partially or substantially define the upstream edge 47, 147 of ramp 48, 148.

According to another aspect, grill 180 can extend the full length of ramp 148, attaching to upstream edge 147 of ramp 148 on its lower end, first sidewall 127 and second sidewall 129 on sides of grill 180, and to upstream edge 139 of spoiler 138 on its top edge, respectively. Attachment of grill can be accomplished by any known fastening means as chosen by a person of skill in the art according to the desired application. According to one aspect, grill 180 can attach to energy generating device 120 by way of clips. According to another aspect, grill 180 can attach to energy generating device 120 by way of screws.

With reference to FIGS. 23 and 24, energy generating device 120 can have one or more vanes 136 disposed around drum 134 similar to vanes 36 of energy generating device 20. Vanes 136 can be constructed and operate in a manner substantially similar to vanes 36, including a first vane sidewall 155, a second vane sidewall 156, a vane rear wall 157, upstream edge 158, and guide edge 159. Guide edge 159 of vane 136 can further include a first roller bearing 160 and a second roller bearing 161 which can operate substantially similar to first and second roller bearings 60 and 61 of energy generating device 20. Open cam 164 can replace stationary cam 64 in energy generating device 120. Open cam 164 can operate substantially similar to stationary cam 64, however, open cam 164 can eliminate portions of the cam 164 that do not contact either the first roller bearing 160 or second roller bearing 161 during rotation of drum 134. The removal of materials from cam 164 can lessen both material shipping weight and manufacturing costs.

Figure 21:
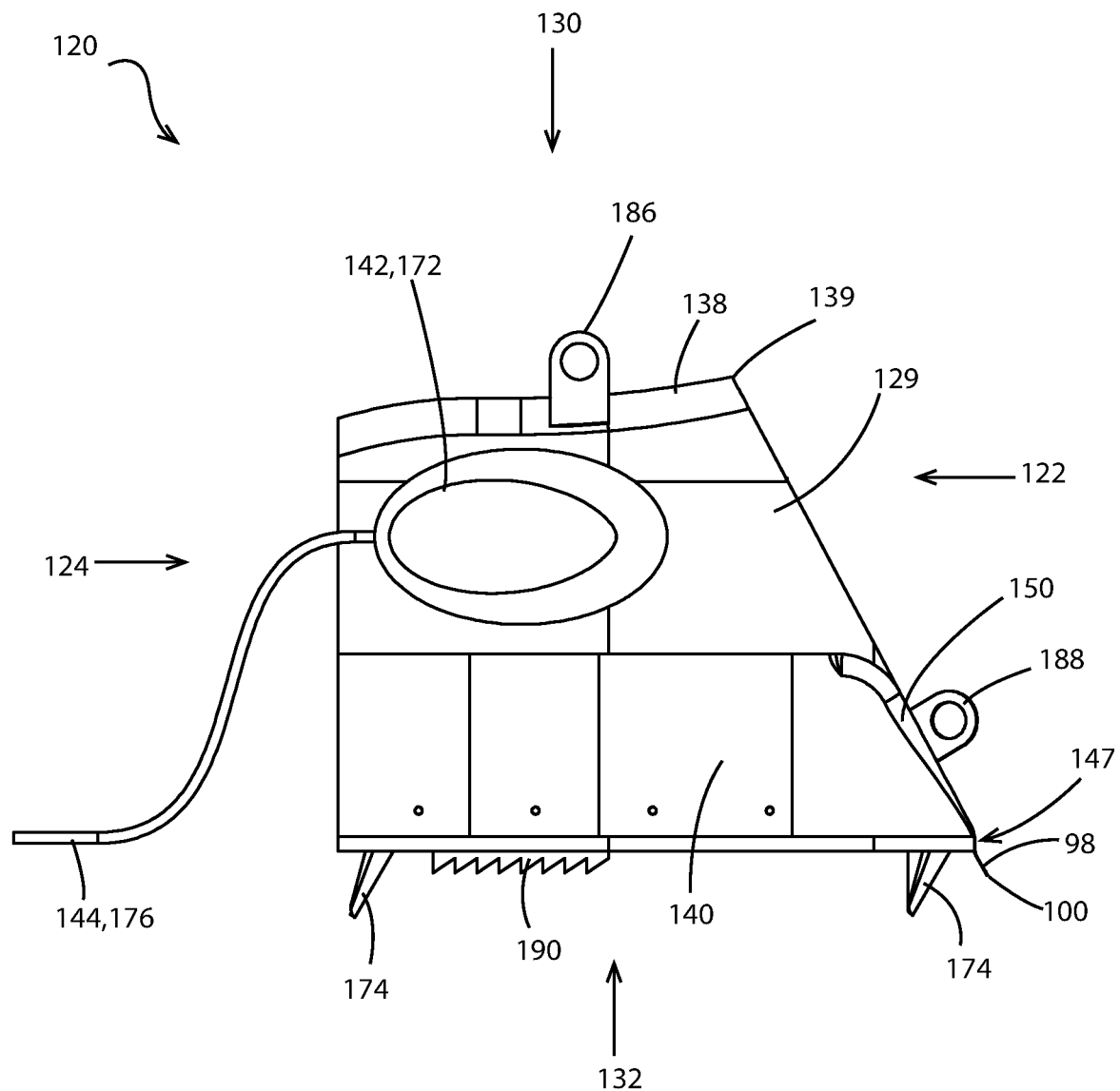
FIG. 21 is a side elevation view of the alternate embodiment of the described device.
Figure 22:
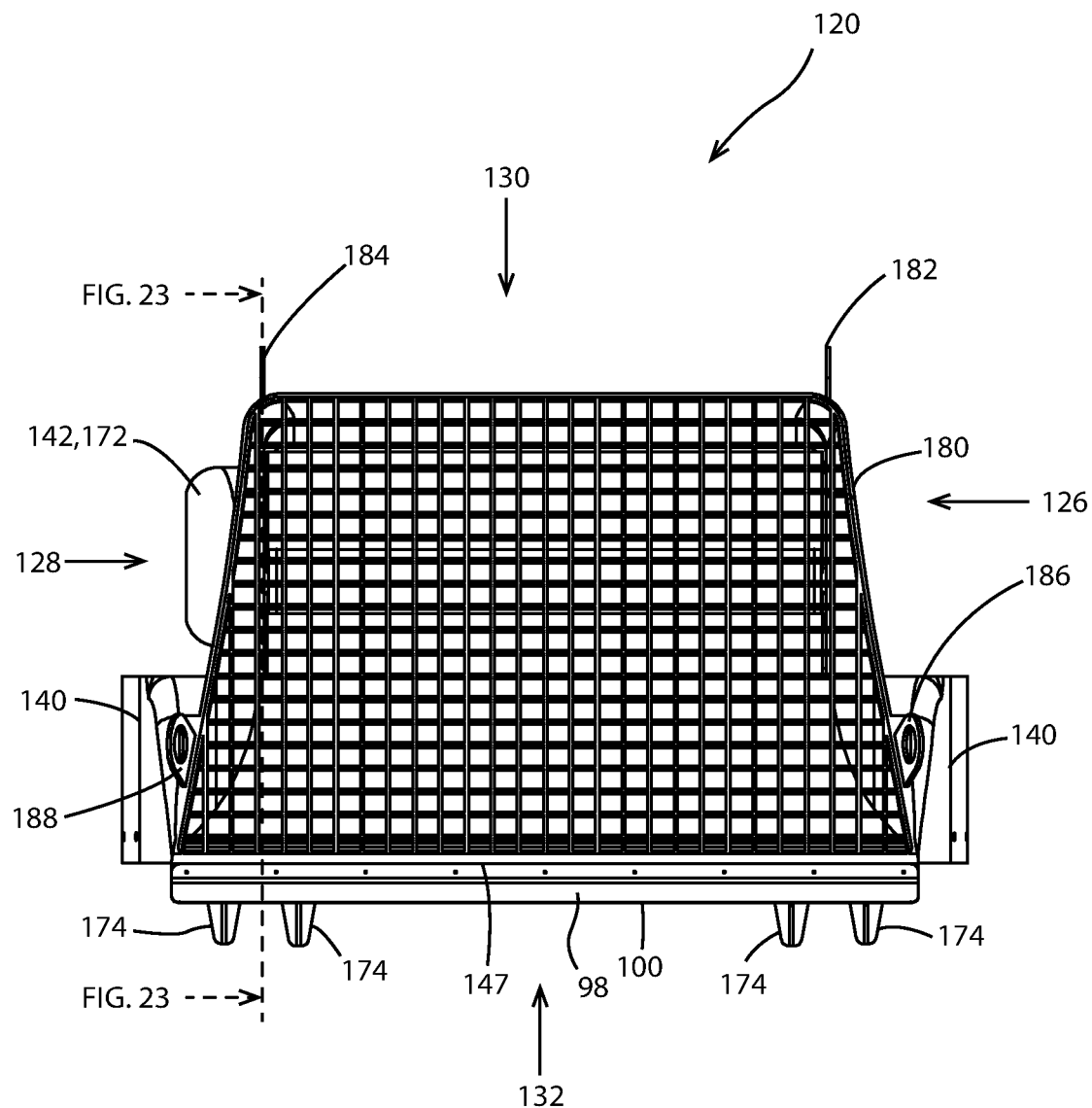
FIG. 22 is a front elevation view of the alternate embodiment of the described device.

With reference FIG. 25, an exploded view of energy generating device 120 is shown. First upper installation mount 182 and first installation mount body 183 can form a continuous piece ending on its bottom side with a series of drag teeth 190. Similarly, second upper installation mount 184 and second installation mount body 185 can form a continuous piece ending with drag teeth 190. First installation mount body 183 can substantially define a portion of first sidewall 127 while second installation mount body 185 can form a portion of second sidewall 129. In construction, first installation mount body 183 can be inserted within first groove 192 of first sidewall 127 while second installation mount body 185 can be inserted within second groove 194 of second sidewall 129 thereby securing both first installation mount body 183, second installation mount body 185, and drum 134 within energy generating device 120. Spoiler 138 can be modified from spoiler 38 to include a first upper installation mount opening 196 and second upper installation mount opening 198 which can allow first upper installation mount 182 and second upper installation mount 184 to pass through spoiler 138, respectively. With reference to FIGS. 21 and 23, when fully assembled, first and second installation mount body 183 and 185 can be substantially or wholly contained within the interior of energy generating device 120 with only first upper installation mount 182, second upper installation mount 184, and drag teeth 190 extending through the body of energy generating device 120.

According to one aspect, ramp 148 of energy generating device 120 can extend the entire longitudinal span of energy generating device 120. The extension of ramp 148 generally indicated as reference 148A can follow the outer contour of drum 134 such that transverse gap 154 and vertical gap 168 become a continuous channel 200 substantially defined with a starting point at the downstream edge 149 of ramp 148, a top wall consisting of outer surface 135 of drum 134 and vane rear wall 157 when vanes 136 are in the stowed position, and a downward or bottom surface being defined by the ramp extension 148A. Ramp extension 148A provides additional protection for drum 134 from debris located on, or uneven distribution of, the bottom surface of an associated body of water and can further direct the flow of water that spills over downstream edge 149 of ramp 148 under drum 134 which can provide similar benefits to water flowing under drum 34 as discussed previously.

In accordance with an aspect of the present disclosure, energy generating device 20 permits access to a reliable and renewable energy source for anyone living on or near a flowing body of water, such as a river. The energy generating device 20 described herein can range in size from a small drum 34A having a diameter of less than three feet to greater than six foot diameter drums 34A or 34B for larger systems. A six foot diameter drum, for example, could produce as much as 20 kilowatts of electricity.

Depending on size, the use of an individual system could generate enough electricity to power a range from small individual homes or cottages to a small village or community. Multiple systems could be deployed in a larger river, such as the Mississippi or the Nile. These multiple systems could work in concert as an energy farm or hydro farm 210 (used herein interchangeably and generally referred to as reference numeral 210) to produce enough energy to power a small town or city. The energy generating device 20 disclosed herein has an added benefit of being installed at the bottom of a flowing body of water and being completely submerged. Therefore, it is not visible from the shore and can be placed out of travel and shipping lanes to prevent interaction with boat traffic. For systems deploying energy generating device 20 along side electrical generator 42, the electrical output from energy generating device 20 could be transferred and stored with a battery or battery bank for later use or alternatively could be hooked directly into a power distribution grid from a public or private utility and distributed across the entirety of the grid as seen fit according to the desired use. Advantages of the energy generating device 20 as disclosed herein include portability which, in this case, can be the ability to locate and relocate energy generating device 20 with minimal effort allowing power to be supplied to more remote locations or for temporary applications. One such temporary application could be to deploy one or more energy generating devices 20 in an area of natural disaster relief to aid in recovery and restoration efforts. In many instances, energy generating device 20 could be installed in a flowing body of water in an area where fresh water is not easily obtained or delivered. In such an application, energy generating device 20 could be coupled with mechanical pump 72 and water hose 76 to deliver fresh water over distance to irrigate fields or provide fresh drinking water to nearby villages or communities.

Figure 26:
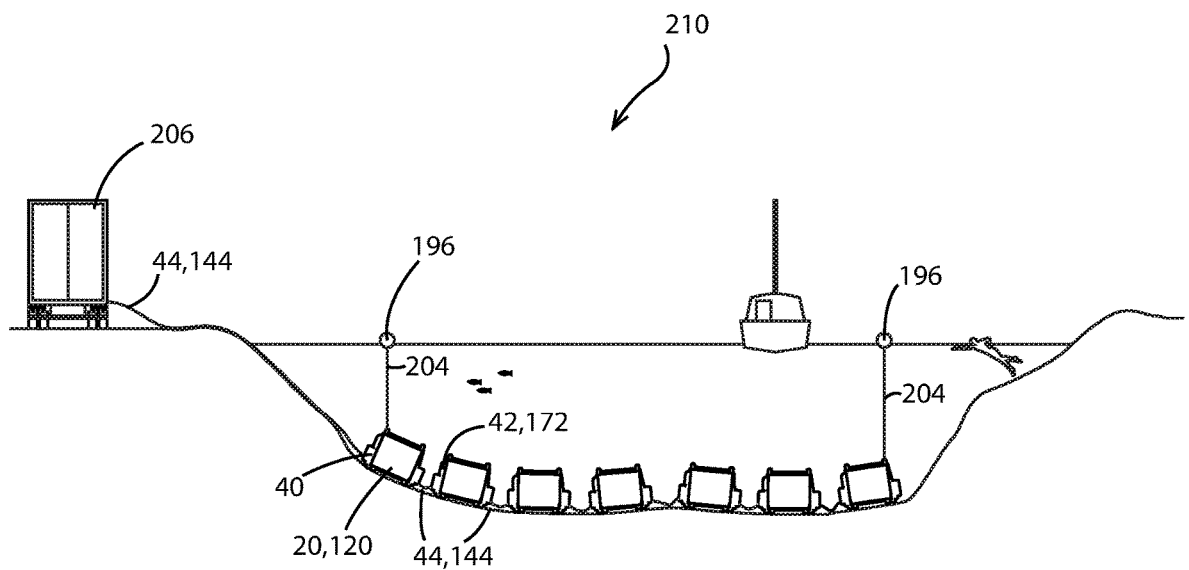
FIG. 26 is an operational cross-section view of a hydro farm employing multiple units of the described device.
Figure 27:
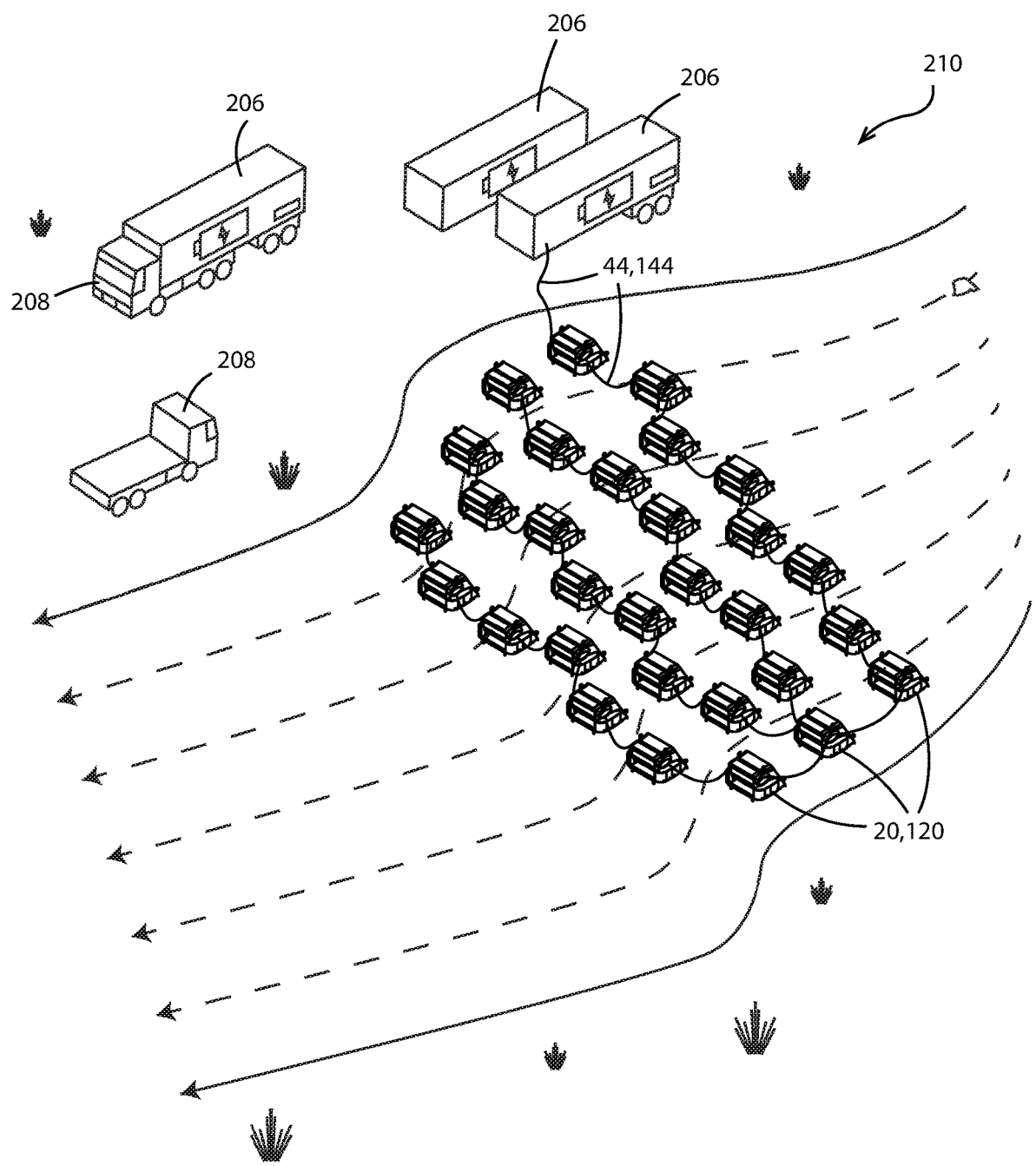
FIG. 27 is a top perspective view of a hydro farm employing multiple units of the described device.

With reference to FIGS. 26 and 27, hydro farms 210 can be deployed in larger rivers, such as the Mississippi or the Nile. Energy generating device 120 can be modified to connect a series of energy generating devices 20 or 120 together. In installations generating electricity, power cord 44, 144 can be bundled together, or alternatively, combined into a single transmission cord. Individual power cords 44, 144 coming from individual energy generating devices 20, 120 can connect to a neighboring energy generating device 20, 120 and pass power therethrough with a single power cord 44, 144 exiting the last energy generating device 20, 120 within a chain and being directed to a desired output location. According to another aspect, each individual power cord 44, 144 from each individual energy generating device 20, 120 can be bundled into a cord 44, 144 exiting the associating body of water. The exact configuration of power cords 44, 144 can be chose by a person skilled in the art without deviating from the scope herein. Similarly, in installations utilizing mechanical pump 72 or 172, water hoses 76 or 176 can likewise be chained or bundled according to the desired installation. Power cord 144 and water hose 176 can include weights (not shown) to secure power cord 144 or water hose 176 to the bottom of the associated body of water similar to weights 44 and 76 as discussed with power cord 44 and water hose 76, respectively. Generally, as applied to hydro farms 210, energy generating devices 20, 120 are low profile and likely to be submerged at sufficient depth to avoid any interaction between energy generating devices 20, 120 and any surface traffic, however, in potential areas of interaction, buoys 202 can be deployed as needed. For example, as seen in FIG. 26, hydro farms 210 placed in rivers utilized for recreational and commercial traffic, including swimming and boating, can be marked by buoys 202 delineating the outer edges of a hydro farm 210. Buoys 202 can be secured to the outermost energy generating devices 20, 120 by means of a tether 204 that can be connected to any of the installation mounts disposed on energy generating device 20, 120 by way of a non-limiting example. Tether 204 can be nylon rope or nylon webbing that can be clipped to first or second upper installation mount 182, 184 of the outermost energy generating devices 20, 120, as shown in FIG. 26. On an opposite end, tether 204 can be connected to a buoy 202 of a type sufficient to notify water goers, including swimmers and boat traffic, of the presence of energy generating devices 20, 120. According to one aspect, multiple individual energy generating devices 20, 120 in a hydro farm 210 can be marked with buoys 202 or flags indicating their presence. This can be especially useful in instances where one or more energy generating devices 20, 120 may interfere with operation of boating and shipping lanes or swimming areas.

With further reference to FIGS. 26 and 27, in instances where a community or individual requires access to consistent energy flow, but is located at a distance impractical to run direct transmission lines or power cords 44, 144 from a hydro farm 210 directly to the desired power output location, power can be generated and stored in a portable battery system such as a battery trailer 206. Battery trailer 206 can be a standard semi-trailer or truck trailer equipped with one or more rechargeable battery banks, individually or in a series, that can store power generated from a hydro farm 210. One example of a trailer is manufactured and provided by Electrovaya and can be available through www.electrovaya.com. Such trailers can contain lithium ion batteries and can have a storage capacity up to 2.5 megawatts.

In accordance with an aspect of the present disclosure, energy generating device 20 provides significant advantages over prior art devices, such as those disclosed and described herein, in the use of deployable and stowable vanes 36 or 86 which reduce both drag and turbulence in the energy generating cycle and rotation cycle of drums 34A or 34B. The reduction of turbulence and drag are substantial and turbulence and drag are therefore nominal and inconsequential to the generation of energy from energy generating device 20. Utilizing various configurations of vane distribution around drum 34A or 34B could result in as much as 300% to 400% torque and power improvement over current known devices of similar size.

In accordance with a further aspect of the present disclosure, the stowable vanes 36 or 86 allow the drum 34A or 34B to be installed and placed lower in the energy generating device 20 as there is no need for additional ground clearance. Accordingly, energy generating device 20 can have a lower center of gravity and a lower overall profile which can serve to help keep energy generating device 20 securely installed on the bottom of a flowing body water and prevents further damage or interaction with surface traffic in deployment scenarios where boats are likely to be present and can allow installation of energy generating device 20 in shallower bodies of water.

According to a further aspect of the present disclosure, the added efficiency of the energy generating device 20 and the stowable or articulating vanes 36 or 86, respectively, further allows energy generating device 20 to be deployed in slower moving water than prior art devices and larger water rotors or turbines. For example, water moving at an average speed of four miles per hour over a long distance could be sufficient to keep energy generating device 20 operational, whereas current solutions consisting of water rotary turbines or rotary propeller generators tend to require sustained water speeds over ten miles per hour to be effective. This allows energy generating device 20 to be deployed in conditions unsuitable for current known solutions and prior art water generators.

In operation, energy generating device 120 operates substantially similar to energy generating device 20 in that water flowing from the first end or upstream end 122 to second or downstream end 124 of energy generating device 120 is directed up ramp 148 and over drum 134 thereby driving deployed vanes 136 through the power stroke zone of rotation of drum 134. As vanes 136 exit the power stroke zone of rotation, they collapse becoming substantially flush with outer surface 135 of drum 134, remaining stowed as they move through the remainder of the rotation of drum 134 before re-deploying as they re-enter the power stroke zone of rotation of drum 134. Water flowing over downstream edge 149 of ramp 148, through transverse gap 154, and then through channel 200 can move faster through channel 200 than water flowing over drum 134 thereby invoking Bernoulli's principle and may result in lift created, as previously discussed with reference to energy generating device 20.

In further operation, installation of energy generating device 120 can be assisted by first upper installation mount 182, second upper installation mount 184, first lower installation mount 186, and second lower installation mount 188 in that crane hooks or other lifting apparatuses can be attached to lifting mounts 182, 184, 186, 188 to lift and place energy generating device 120 within an associated body of water. When installed in a body of water with a muddy or soft bottom surface, optional anchors 174 can be included to secure energy generating device 120 in place. On a more compact bottom surface, drag teeth 190 can further prevent shifting or movement of energy generating device 120 once it is place.

In operation, a hydro farm 210 is contemplated to charge one or more battery trailers 206 simultaneously while additional charged battery trailers 206 are in use on site. Batter trailers 206 can then be transported by truck 200 or by any other means as known in the art, such as train or ship, to a location in need. In extreme scenarios, battery trailers 206 can be airlifted into and out of areas that are inaccessible through other means. As the battery trailers 206 that are in use become depleted, battery trailers 206 can be driven to the hydro farm 210 and exchanged for fully charged battery trailers 206. Applications of such a system can provide power clean, renewable power across a distance that is otherwise impractical to traverse with power transmission cables. These systems can also provide power in locations temporarily deprived of power, such as in areas of natural disaster recovery. Application of hydro farms 210 utilizing energy generating device 20, 120 can be permanently placed or can be temporarily placed which can allow clean, renewable power to be delivered almost anywhere on the globe utilizing this method.

According to another aspect, the hydro farms 210 can be equipped to pump water into storage containers including portable storage containers, such as tanker trailers, which can deliver clean, fresh water in a manner similar to the battery trailers 206 in that a continuous supply of clean water can be pumped into storage containers for later use and/or transport to a needed location. According to another aspect, hydro farms 210 can be set up and installed having a portion of the energy generating devices 20, 120, delivering electrical energy while a second portion of the energy generating devices 20, 120 delivers water as needed according to the present circumstances.

In instances of temporary installations, hydro farms 210 utilizing energy generating device 20, 120 can be assembled and installed in a short timeframe and brought online quickly which can reduce the amount of response time in disaster scenarios or scenarios where speed of power and/or water delivery is critical.

In operation, energy generating device 20 can be packaged and shipped in a smaller container having a smaller cube weight and therefore shipping costs due to vanes 36 or 86 collapsing and conforming to outer surface 35 of drum 34A or 34B, thus allowing energy generating device 20 to be shipped and delivered to almost any location globally at less expense. Additionally, having the end user install ballast into ballast boxes 40 at the installation site further reduces manufacturing and delivery costs. Energy generating device 20 can be then assembled by the end user quickly and placed in the desired location within an associated body of water and operated normally with minimal installation time and effort.

In operation, energy generating device 20 is operable to provide either electrical or mechanical energy by providing energy generating device 20, assembling energy generating device 20, installing energy generating device 20 into the associated body of water, securing energy generating device 20 to the bottom of said body of water, filling ballast box 40 with appropriate ballast, and directing power cord 44 or alternatively water hose 76 to the desired location.

As used throughout this disclosure, energy generating device 20 and energy generating device 120 are contemplated to be interchangeable and aspects and embodiments described herein are contemplated to be equally applicable to either energy generating device 20 or 120. Therefore any reference to energy generating device 20 or energy generating device 120 are not necessarily limited to that embodiment.

An embodiment is an implementation or example of the present disclosure. Reference in the specification to "an embodiment," "one embodiment," "some embodiments," "one particular embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," or "other embodiments," or the like, are not necessarily all referring to the same embodiments.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

Additionally, any method of performing the present disclosure may occur in a sequence different than those described herein. Accordingly, no sequence of the method should be read as a limitation unless explicitly stated. It is recognizable that performing some of the steps of the method in an different order could achieve a similar result.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of various embodiments of the disclosure are examples and the disclosure is not limited to the exact details shown or described.

What is claimed:

1. An energy generating device comprising:
    a body;
    a cylindrical drum contained within the body and rotatable about a substantially transverse axis;
    a stationary cam;
    at least one movable vane having a first closed end, a second closed end, and a curved rear wall, the at least one movable vane forming a cupped shaped and pivotally connected to an outer surface of the drum;
    at least one roller bearing connected to the at least one movable vane and operable to interact with the stationary cam to move the at least one movable vane to a plurality of positions between a deployed state wherein the flow of water from an associated body of water over the cylindrical drum and into the at least one movable vane drives the rotation of the cylindrical drum about the transverse axis, and a stowed state wherein the curved rear wall of the movable vane sits substantially flush with the outer surface of the cylindrical drum; and
    a spring that biases the at least one vane towards the stowed state when the at least one roller bearing is not contacting the stationary cam.

2. The energy generating device of claim 1 wherein the at least one vane further comprises:
    a first closed end;
    a second closed end, the curved rear wall, the first closed end, and the second closed end thereby forming a cupped shape; and
    at least one roller bearing.

3. The energy generating device of claim 2 wherein the at least one movable vane is movable through interaction between the at least one roller bearing and the stationary cam.

4. The energy generating device of claim 3 wherein the rotation of the drum about the transverse axis is driven by the flow of water from an associated body of water over the drum and into the at least one movable vane when in the deployed state.

5. The energy generating device of claim 4 wherein the at least one movable vane moves from the stowed state to the deployed state as the at least one movable vane enters the flow of water over the drum and moves from the deployed state to the stowed state as the at least one movable vane exits the flow of water over the drum.

6. The energy generating device of claim 4 further comprising a ramp upstream of the drum wherein the ramp further comprises:
    a first sidewall;
    a second sidewall;
    an upstream edge; and
    a downstream edge;
    and wherein the ramp is shaped to direct the flow of water over the drum.

7. The energy generating device of claim 4 further comprising a projection upstream of the drum configured to provide downforce to the energy generating device when water flows over the projection.

8. The energy generating device of claim 4 further comprising a spoiler attached to the body above the drum and the at least one movable vane when the vane is in the fully deployed position.

9. The energy generating device of claim 4 further comprising at least one ballast box fixed to at least one side of the body wherein the at least one ballast box further comprises a lid.

10. The energy generating device of claim 9 wherein the ballast box and the lid further comprise a perforated ballast box and a perforated lid.

11. The energy generating device of claim 4 further comprising at least one anchor extending downward from the body of the energy generating device and operable to anchor the energy generating device to the bottom surface of the associated body of water.

12. The energy generating device of claim 4 further comprising a grill extending transversely across the body and upstream of the drum and the at least one vane.

13. The energy generating device of claim 4 wherein the drum further comprises at least one flywheel fixed to the drum.

14. The energy generating device of claim 4 wherein the drum further comprises at least one sidewall containing at least one hole.

15. The energy generating device of claim 4 further comprising:
    an electrical generator coupled to the drum and operable to convert rotational energy from the drum to electrical energy; and
    a power cord for carrying the electrical energy away from the generator.

16. The energy generating device of claim 4 further comprising:
    a mechanical pump coupled to the drum and operable to convert rotational energy from the drum to mechanical energy to operate the mechanical pump to thereby pump water; and
    a water hose for carrying the water away from the mechanical pump.

* * * * *